United States Patent
Deguchi et al.

(10) Patent No.: US 6,388,698 B1
(45) Date of Patent: May 14, 2002

(54) IMAGE RECORDING APPARATUS WITH RECORDING PERIOD CONTROL

(75) Inventors: Takashi Deguchi; Toru Kawabe; Tuyosi Hattori, all of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/099,906

(22) Filed: Jun. 19, 1998

(30) Foreign Application Priority Data

Jun. 27, 1997 (JP) ............................................. 9-171835

(51) Int. Cl.⁷ .............................. B41J 2/47; H04N 1/23
(52) U.S. Cl. ....................................... 347/240; 358/298
(58) Field of Search ................................. 347/237, 240; 358/298, 1.9

(56) References Cited

U.S. PATENT DOCUMENTS

| | | | | |
|---|---|---|---|---|
| 4,525,729 A | * | 6/1985 | Agulnek et al. | 347/237 |
| 4,837,587 A | * | 6/1989 | Ng | 347/237 |
| 5,128,692 A | * | 7/1992 | Reisch | 347/252 |
| 5,138,337 A | * | 8/1992 | Ng | 347/237 |

* cited by examiner

Primary Examiner—David F. Yockey
(74) Attorney, Agent, or Firm—Frishauf, Holtz, Goodman, Langer & Chick, P.C.

(57) ABSTRACT

In an image recording apparatus provided with a recording head and a conveyor for relatively moving the recording head and an image recording medium, an image composed of a large number of pixels is recorded by plural recording elements of the recording head on the image recording medium relatively moved by the conveyor. Each recording element of the recording head is controlled to conduct turning on or off plural times (N times) so that one pixel is recorded by plural recording periods of each recording element, and a time length T(m) of each recording period is not increased monotonously or is not decreased monotonously with respect to recording sequential order "m" of each recording period in recording of each pixel, wherein "m" is an integer not less than 0 and not more than N−1. The time length of each recording period is obtained by adding one or two coefficients to a binary-weighted value.

6 Claims, 23 Drawing Sheets

ARRANGEMENT DIRECTION

ARRANGEMENT DIRECTION

ARRANGEMENT DIRECTION

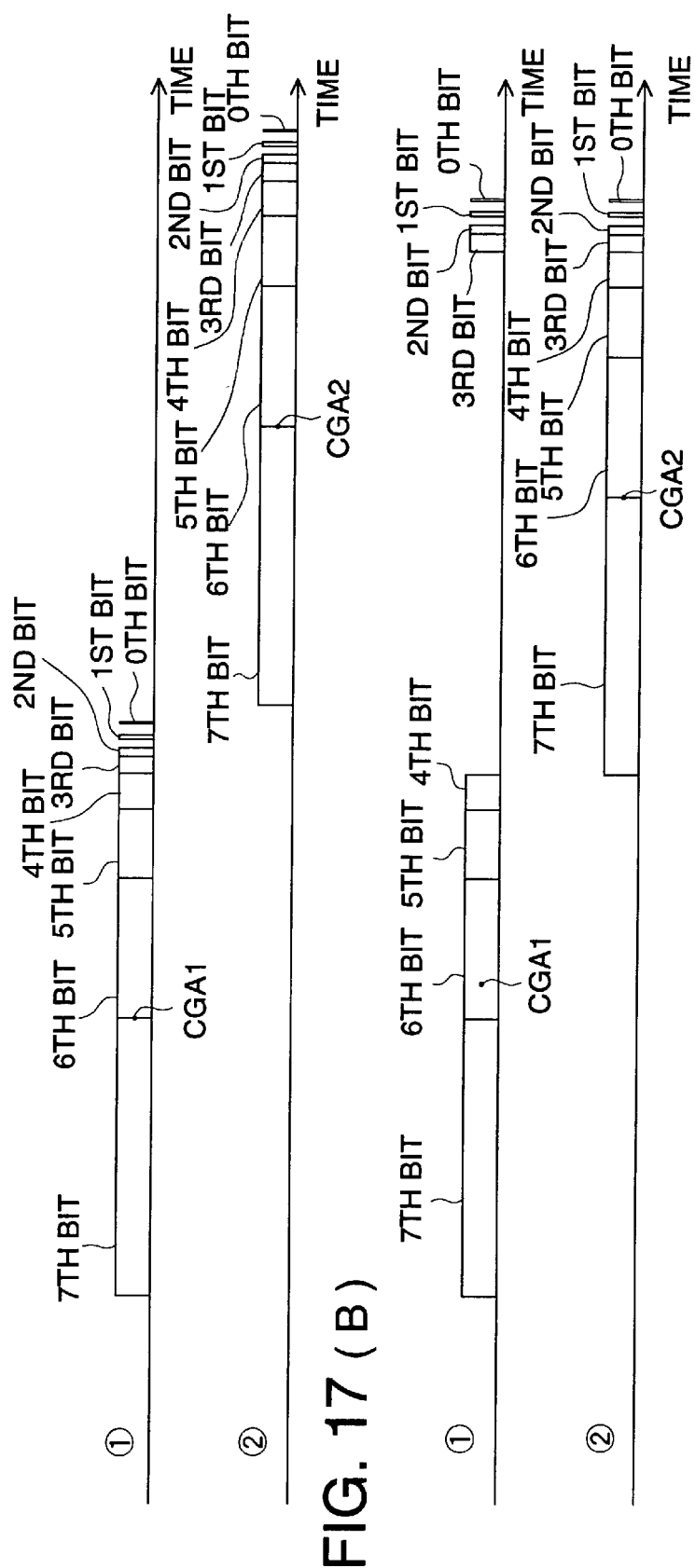

IMAGE RECORDING APPARATUS WITH RECORDING PERIOD CONTROL

BACKGROUND OF THE INVENTION

The present invention relates to an image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, the image recording apparatus records an image formed of a large number of pixels by the recording operation of each recording section of the recording head, on the image recording medium which is relatively moved by the moving means.

Conventionally, the following image recording apparatus is widely known: the image recording apparatus having a recording head on which a plurality of recording sections are arranged dotted line-like in one or a plurality of rows; a moving means for relatively moving the recording head and a photosensitive material; and a control means for controlling each light emitting section of the recording head so that one pixel is exposed by turning ON or turning OFF exposing in each of plural times (N times) of exposure periods for each light emitting section of the recording head, the image recording apparatus records an image formed of a large number of pixels by exposure of each light emitting section of the recording head, on the photosensitive material which is relatively moved by the moving means.

As one of these methods, it is considered and tested to record a multi-contrast image by an image recording apparatus in which the length T(m) of each exposure period satisfies the following equation with respect to the elapsed time sequence m (m is an integer not less than 0 and not more than N−1) of each exposure period in recording of each pixel, $$T(m) = \alpha \times 2^m$$

Where, $\alpha$ is a coefficient of a positive real number independent of m.

When the above equation is satisfied, the elapsed time sequence of each exposure period becomes that arranged sequentially from a short exposure period to a long exposure period, as shown in FIG. 13.

The control means controls each light emitting section of the recording head so that one pixel is recorded by turning ON or OFF the exposure in the m-th exposure period corresponding to the m-th digit data of multi-contrast image data expressed by a plurality of bits, in such a manner that, from multi-contrast image data expressed by a plurality of bits, 1 pixel is recorded by turning ON or OFF the exposure in the $0^{th}$ exposure period corresponding to the $0^{th}$ digit data; by turning ON or OFF the exposure in the $1^{st}$ exposure period corresponding to the $1^{st}$ digit data; by turning ON or OFF the exposure in the $2^{nd}$ exposure period corresponding to the $2^{nd}$ digit data, . . . , and an image is recorded by exposing pixels on the photosensitive material in the image recording apparatus.

However, in this image recording apparatus, it is known that, when an image, which is commonly called gradation in which density is monotonously increased or decreased in a predetermined direction, is exposed on the photosensitive material, a high density line or a low density line which does not originally exist in the gradation image, is generated during recording and becomes conspicuous.

To the inventor's surprise, not only the above description, but also the following is found: in an image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, the image recording apparatus records an image formed of a large number of pixels by the recording operation of each recording section of the recording head, on the image recording medium which is relatively moved by the moving means, when a gradation image is recorded on the image recording medium by an image recording apparatus in which the length T(m) of each recording period satisfies the following equation with respect to the elapsed time sequence m (m is an integer not less than 0 and not more than N−1) of each recording period in recording of each pixel, and in which the control means controls each light emitting section of the recording head so that one pixel is recorded by turning ON or OFF the recording in the m-th exposure period corresponding to the m-th digit data of multi-contrast image data expressed by a plurality of bits, in such a manner that, from multi-contrast image data expressed by a plurality of bits, 1 pixel is recorded by turning ON or OFF the recording in the $0^{th}$ recording period corresponding to the $0^{th}$ digit data; by turning ON or OFF the recording in the $1^{st}$ recording period corresponding to the $1^{st}$ digit data; by turning ON or OFF the recording in the $2^{nd}$ recording period corresponding to the $2^{nd}$ digit data, . . . , then, a high density line or a low density line which does not originally exist in the gradation image, is generated during recording and becomes conspicuous.

$$T(m) = \alpha \times 2^m$$

Where, $\alpha$ is a coefficient of a positive real number independent of m.

SUMMARY OF THE INVENTION

An object of the present invention is to prevent a high density line or low density line, which does not exist in a gradation image, from being generated even when the gradation image is recorded on the image recording medium.

As a theme of the present invention, a cause by which a high density line or a low density line which does not exist in the gradation image, is generated during recording and becomes conspicuous, is deeply considered, and as the result, the cause is considered as follows: the length T(m) of each recording period satisfies the following equation with respect to the elapsed time sequence m (m is an integer not less than 0 and not more than N−1) of each recording period in recording of each pixel, $$T(m) = \alpha \times 2^m$$

That is, for example, in the case where an image is recorded according to N-bit image data, when M is a natural number not more than N−1, in most cases, the elapsed time center of gravity of a recording operation of 1 pixel is scarcely changed between both image recording of pixels having the value different by only 1, in such a manner that the elapsed time center of gravity of a recording operation of 1 pixel is scarcely changed between the recording of the pixel having the value of $2^M-2$ and that of the pixel having the value of $2^M-1$, and the elapsed time center of gravity of a recording operation of 1 pixel is also scarcely changed between the recording of the pixel having the value of $2^M$ and that of the pixel having the value of $2^M+1$. In contrast to that, the elapsed time center of gravity of a recording operation of 1 pixel is greatly changed between the recording of the pixel having the value of $2^M-1$ and that of the pixel having the value of $2^M$, as shown in FIG. 13. Accordingly, the positional center of gravity of the recording operation of 1 pixel is greatly changed due to the relative movement of the recording head and the image recording medium during that time, as shown by a dashed line in FIG. 14(A), and therefore, the positional center of gravity of a recorded amount of 1 pixel is greatly changed, as shown by a solid line in FIG. 14(A).

Accordingly, it is considered that, when the gradation image is recorded on the image recording medium, although, as shown in FIG. 14, the positional center of gravity of the recorded amount is scarcely changed in most cases between adjoining pixels themselves, the positional center of gravity of the recorded amount largely differs between adjoining pixel having the value of $2^M-1$ and pixel having the value of $2^M$, and the shift of the positional center of gravity of the recorded amount becomes large, thereby, the low density line or the high density line (a linear area of the low recorded amount shown in FIG. 14(B)) is generated and becomes conspicuous.

The theme of the present invention is attained by the following items.

Item 1

An image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, the image recording apparatus records an image formed of a large number of pixels by the recording operation of each recording section of the recording head, on the image recording medium which is relatively moved by the moving means, wherein the length T(m) of each recording period is not increased monotonously or is not decreased monotonously with respect to the elapsed time sequence m (m is an integer not less than 0 and not more than N−1) of each recording period in recording of each pixel.

By the invention described in Item 1, the elapsed center of gravity of recording of each pixel can be prevented from largely differing from that of each other, and accordingly, the positional center of gravity of recording of each pixel can be prevented from largely differing from that of each other, thereby, generation of a low density line or a high density line by continuously recording the pixel in which the positional center of gravity of the image recording largely differs from each other, can be suppressed.

Incidentally, an example in which the length T(m) of each recording period is not increased monotonously or is not decreased monotonously with respect to the elapsed time sequence m (m is an integer not less than 0 and not more than N−1) of each recording period in recording of each pixel, is shown in FIG. 15. In this connection, in the following example, an image of 8-bit gradation (gradation expressed by 8 digits in the binary system of the $0^{th}$ bit to the $7^{th}$ bit) is recorded in each recording period in the image recording apparatus in which 1 pixel is recorded by turning ON or OFF the recording of the recording section in each of recording periods of 8 times (N=8) for each recording section of the recording head. Each recording period corresponds to any bit of 8-bit gradation, and the length TS (n) of the recording period corresponding to the n-th bit (n is an integer not less than 0 and not more than 7) of the 8-bit gradation is expressed by the following equation.

$$TS(n)=2^n$$

However, of course, the present invention is not limited to such the premise.

FIG. 15(A) shows an example in which a plurality of recording periods to record 1 pixel is arranged in an elapsed time sequence of the recording period corresponding to the $1^{st}$ bit, the recording period corresponding to the $3^{rd}$ bit, the recording period corresponding to the $5^{th}$ bit, the recording period corresponding to the $7^{th}$ bit, the recording period of the $6^{th}$ bit, the recording period corresponding to the $4^{th}$ bit, the recording period corresponding to the $2^{nd}$ bit, and the recording period corresponding to the $0^{th}$ bit. The present example is an example in which generation of a low density line or a high density line in image recording of the gradation image can be entirely suppressed.

FIG. 15(B) shows an example in which a plurality of recording periods to record 1 pixel is arranged in an elapsed time sequence of the recording period corresponding to the $6^{th}$ bit, the recording period corresponding to the $7^{th}$ bit, after that, in sequence, from the recording period corresponding to the $5^{th}$ bit to the recording period corresponding to the $0^{th}$ bit. The present example is an example in which generation of a low density line or a high density line in the recording area for values not less than $2^6$ can be effectively suppressed, for example, generation of a low density line or a high density line between recording of the value an $2^7$ and recording of the value an $2^7-1$ in image recording of the gradation image can be suppressed.

FIG. 15(C) shows an example in which a plurality of recording periods to record 1 pixel is arranged in an elapsed time sequence of the recording period corresponding to the $6^{th}$ bit, the recording period corresponding to the $4^{th}$ bit, the recording period corresponding to the $2^{nd}$ bit, the recording period corresponding to the $0^{th}$ bit, the recording period of the $1^{st}$ bit, the recording period corresponding to the $3^{rd}$ bit, the recording period corresponding to the $5^{th}$ bit, and the recording period corresponding to the $7^{th}$ bit.

FIG. 15(D) shows an example in which a plurality of recording periods to record 1 pixel is arranged in an elapsed time sequence of the recording period corresponding to the $7^{th}$ bit, the recording period corresponding to the $5^{th}$ bit, the recording period corresponding to the $6^{th}$ bit, and after that, in sequence, from the recording period corresponding to the $4^{th}$ bit to the recording period corresponding to the $0^{th}$ bit. The present example is an example in which generation of a low density line or a high density line in the recording area for values not less than $2^5$ and not more than $2^7-1$ can be effectively suppressed, for example, generation of a low density line or a high density line between recording of the value of $2^6$ and recording of the value of $2^6-1$ in image recording of the gradation image can be suppressed.

FIG. 15(E) shows an example in which the recording period corresponding to the $7^{th}$ bit, which is the uppermost bit, is divided into a relatively shorter period which is before in a time series, and a relatively longer period which is after in a time series, and a plurality of recording periods to record 1 pixel is arranged in an elapsed time sequence of a portion of the recording period corresponding to the $7^{th}$ bit, the recording period corresponding to the 6$^{th}$ bit, a portion of the recording period corresponding to the 7$^{th}$ bit, after that, in sequence from the recording period corresponding to the 5$^{th}$ bit to the recording period corresponding to the 0$^{th}$ bit. In this connection, although the recording period corresponding to the 7$^{th}$ bit is divided into 2 periods, because recording ON or recording OFF is the same in these periods, these periods are incorporated and considered to be one recording period. The elapsed time sequence of each recording period in the recording of each pixel is considered by using the center of gravity of image recording of each recording period. Accordingly, in FIG. 15(E), the center of gravity of the recording period corresponding to the 7$^{th}$ bit is after in a time series with respect to the center of gravity of the recording period corresponding to the 6$^{th}$ bit, therefore, the recording period corresponding to the 6$^{th}$ bit, the recording period corresponding to the 7$^{th}$ bit, and after that, in sequence, the recording periods from the recording period corresponding to the 5$^{th}$ bit to the recording period corresponding to the 0$^{th}$ bit, are arranged in elapsed time sequence.

Item 2

The image recording apparatus according to Item 1, wherein, in recording of each pixel, the longest recording period in the plural times of the recording periods includes the elapsed time center of gravity of all of the plural times of recording periods.

In many cases, it is a cause of the conspicuousness of the low density line or the high density line that a positional center of gravity of recording of 1 pixel largely differs between the case where the recording operations is conducted only in the longest recording period in the plural times (N times) of the recording periods (hereinafter, sometimes, the longest recording period in the plural times (N times) of the recording periods is called the longest recording period), and the case where the recording operation is conducted for a value of image data which is lower by 1 than the value of image data when the recording operation is conducted only in the longest recording period (the recording operation is not conducted in the longest recording period). However, according to the invention described in Item 2, it can be made in the recording of each pixel that the elapsed time center of gravity does not largely differ between the elapsed time center of gravity of image recording in the case where the image is recorded only in the longest recording period, and the elapsed time center of gravity in the case where image recording of the value of image data which is lower than the above-described value of image data by 1, is conducted. That is, the positional center of gravity of the image recording can be made so that it is not largely different from each other, and it can be suppressed that the low density line or the high density line becomes conspicuous in the gradation image.

As an example in which, in recording of each pixel, the longest recording period in the plural times (N times) of the recording periods includes the elapsed time center of gravity of all of the plural times(N times) of recording periods, (A), (B), and (E) in FIG. 15 correspond to the example. That is, in FIG. 15 (A), (B), in the recording of each pixel, the recording period corresponding to the 7$^{th}$ bit, which is the longest recording period, exists in the center of all of the plural times of recording periods, therefore, naturally, in the recording of each pixel, the longest period includes the elapsed time center of gravity CGA of all of the plural times of recording periods. Further, in FIG. 15(E), the elapsed time center of gravity CGA of all of the plural times (N times) of recording periods exists in the latter half side of the recording period corresponding to the 7$^{th}$ bit, which is the longest period. (The elapsed time center of gravity CGA exists between the leading time TP3 and the trailing time TP4 of the latter half side of the recording period corresponding to the 7$^{th}$ bit.)

Item 3

The image recording apparatus according to Item 1 or Item 2, in which, in recording of each pixel, the longest recording period in the plural times of the recording periods exists between the second longest recording period and the third longest recording period in a time series.

In many cases, it is a cause of the conspicuousness of the low density line or the high density line that a positional center of gravity of recording of 1 pixel largely differs between the case where the recording operations is conducted only in the longest recording period in the plural times (N times) of the recording periods (hereinafter, sometimes, the longest recording period in the plural times (N times) of the recording periods is called the longest recording period), and the case where the recording operation is conducted for a value of image data which is lower by 1 than the value of image data when the recording operation is conducted only in the longest recording period (the recording operation is not conducted in the longest recording period). However, according to the invention described in Item 3, it can be suppressed in the recording of each pixel that the elapsed time center of gravity of the recording largely differs between that of image recording in the case where the image is recorded only in the longest recording period, and that in the case where image recording of the value of image data which is lower than the above-described value of image data by 1, is conducted. Thereby, the positional center of gravity of the recording of 1 pixel can be suppressed so that it is not largely different from each other, and it can be suppressed that the low density line or the high density line becomes conspicuous.

In this connection, it is judged by the elapsed time center of gravity of each recording period whether, in recording of each pixel, the longest recording period in the plural times of the recording periods exists between the second longest recording period and the third longest recording period in a time series or not. Further, as an example in which, in recording of each pixel, the longest recording period in the plural times of the recording periods exists between the second longest recording period and the third longest recording period in a time series, (A), (B), and (E) in FIG. 15 correspond to the example. That is, in FIG. 15(A) and (B), the recording period corresponding to the 7$^{th}$ bit, which is the longest recording period, exists between the recording period corresponding to the 6$^{th}$ bit, which is the second longest recording period, and the recording period corresponding to the 5$^{th}$ bit, which is the third longest recording period, in a time series. Further, in FIG. 15(E), the elapsed time center of gravity CG7 of the recording period corresponding to the 7$^{th}$ bit, which is the longest recording period, exists between the elapsed time center of gravity CG6 of the recording period corresponding to the 6$^{th}$ bit, which is the second longest recording period, and the elapsed time center of gravity CG5 of the recording period corresponding to the 5$^{th}$ bit, which is the third longest recording period.

Item 4

An image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, the image recording apparatus records an image formed of a large number of pixels by the recording operation of each recording section of the recording head, on the image recording medium which is relatively moved by the moving means, wherein the length TA1(m) of the recording period in concerned order in at least one recording section A1 in continuous plural recording sections of the recording head is different from the length TA2(m) of the recording period in concerned order in at least another one recording section A2, with respect to the elapsed time sequence m (m is an integer not less than 0 and not more than N−1) of each recording period in recording of each pixel of the plurality of pixels which form 1 line in the direction perpendicular to the direction of the relative movement.

According to the invention described in Item 4, in the recording of the plurality of pixels forming 1 line, the elapsed time center of gravity of the recording is averaged in the continuous plural recording sections of the recording head, and accordingly the positional center of gravity of the recording is averaged, thereby, even if the gradation image is recorded, generation of the low density or high density line in the recorded gradation image can be suppressed.

In this connection, as the plural number of the continuous plural recording section of the recording head, the natural number not less than 2 and not more than 16 is preferable, and specifically the number not more than 8, and further, not more than 4 is preferable.

An example in which the length TA1(m) of the recording period in concerned order in at least one recording section A1 in continuous plural recording sections of the recording head is different from the length TA2(m) of the recording period in concerned order in another recording section A2, with respect to the elapsed time sequence m (m is an integer not less than 0 and not more than N−1) of each recording period in recording of each pixel of the plurality of pixels which form 1 line in the direction perpendicular to the direction of the relative movement, is shown in FIG. 16. In this connection, in the following example, an example is described in which an image with 8-bit gradation (the gradation expressed by 8 digits from the $0^{th}$ bit to the $7^{th}$ bit in the binary system) is recorded in the image recording apparatus in which 1 pixel is recorded by turning ON or turning OFF the recording of the recording section in each of recording periods of 8 times (N=8) for each recording section of the recording head. Each recording period corresponds to any bit of 8-bit gradation and the length TS(n) of the recording period corresponding to the n-th bit (n is an integer not less than 0 and not more than 7) of the 8-bit gradation is expressed by the following equation.

$$TS(n)=2^n$$

However, of course, the present invention is not limited to such the premise.

FIG. 16(A) shows an example in which, in the recording of the plurality of pixels which form 1 line in the direction perpendicular to the direction of the relative movement, the elapsed time sequence of the recording period (the longest recording period) corresponding to the $7^{th}$ bit in the plural times of recording periods to record 1 pixel is different between the recording section A1 and the recording section A2. An example is shown in FIG. 16, in which, in the recording section A1 ((1) in FIG. 16), each recording period to record 1 pixel is arranged in the elapsed time sequence, in sequence from the recording period corresponding to the $7^{th}$ bit to the recording period corresponding to the $0^{th}$ bit, and in the recording section A2 ((2) in FIG. 16), each recording period to record 1 pixel is arranged in the elapsed time sequence of the recording period corresponding to the $6^{th}$ bit, the recording period corresponding to the $7^{th}$ bit, and after that, in sequence from the recording period corresponding to the $5^{th}$ bit to the recording period corresponding to the $0^{th}$ bit.

FIG. 16(B) shows an example in which, in the recording of the plural pixels forming one line in the direction perpendicular to the direction of the relative movement, the elapsed time sequence of the plural times of recording periods to record 1 pixel is just the opposite in the recording section A1 and the recording section A2. That is, in the recording section A1 ((1) in FIG. 16), each recording period to record 1 pixel is arranged in the elapsed time sequence, in sequence from the recording period corresponding to the $7^{th}$ bit to the recording period corresponding to the $0^{th}$ bit, and in the recording section A2 ((2) in FIG. 16), each recording period to record 1 pixel is arranged in the elapsed time sequence, in sequence from the recording period corresponding to the $0^{th}$ bit to the recording period corresponding to the $7^{th}$ bit.

Incidentally, as an example of the recording section A1 and the recording section A2, the following are listed, however, the present invention is not limited to those: the recording sections at the even-numbered order or the recording sections at the odd-numbered order from the one end; the recording sections at the order of the multiple of 4 from one end and the other recording sections; the recording sections at the order of the multiple of 4 from one end and the recording sections at the order of (the multiple of 4+2) from one end; the recording sections at the order of (the multiple of 4+1) from one end and the recording sections at the order of (the multiple of 4+3) from one end, or the like.

Item 5

The image recording apparatus according to Item 4, wherein continuous plural recording sections of the recording head are 2 adjoining recording sections of the recording head.

According to the invention described in Item 5, even when the gradation image is recorded, the elapsed time center of gravity of the recording is averaged in the adjoining recording sections. Accordingly, the positional center of gravity of the recording is averaged, thereby, generation of the low density or high density line in the recorded gradation image can be more effectively suppressed.

Item 6

The image recording apparatus according to Item 4 or Item 5, wherein, with respect to the elapsed time sequence m (m is not less then 0 and not more than N−1), the length TA1(m) of the recording period in concerned order in the recording section A1 is symmetrical with the length TA2(m) of the recording period in concerned order in the recording section A2.

According to the invention described in Item 6, even when the gradation image is recorded, the elapsed time center of gravity of the recording is more appropriately averaged between the recording section A1 and the recording section A2, and accordingly, the positional center of gravity of the recording is more finely averaged, thereby, generation of the low density or high density line in the recorded gradation image can be more effectively suppressed.

In this connection, the description that, with respect to the elapsed time sequence m (m is not less then 0 and not more than N−1), the length TA1(m) of the recording period in concerned order in the recording section A1 is symmetrical with the length TA2(m) of the recording period in concerned order in the recording section A2, means that, with respect to an arbitrary p (p is an integer not less than 0 and not more than N−1), $TA1(p)=TA2(N-1-p)$ is satisfied.

Incidentally, as an example in which, with respect to the elapsed time sequence m (m is not less then 0 and not more than N−1), the length TA1(m) of the recording period in concerned order in the recording section A1 is symmetrical with the length TA2(m) of the recording period in concerned order in the recording section A2, (B) in FIG. 16 corresponds to that.

Item 7

An image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, the image recording apparatus records an image formed of a large number of pixels by the recording operation of each recording section of the recording head, on the image recording medium which is relatively moved by the moving means, wherein the control means controls each recording section of the recording head so that, in the recording of the plural pixels forming 1 line in the direction perpendicular to the direction of the relative movement, the elapsed time center of gravity of all of the plural times of recording periods of at least one recording section of the continuous plural recording sections of the recording head exists in the outside of the range from the top to the last in a time series, of all of the plural times of recording periods of the other recording sections.

According to the invention described in Item 7, the influence of variation of the elapsed time center of gravity of the recording in each pixel is decreased as the whole, thereby, even when the gradation image is recorded, the conspicuousness of the low density or high density line in the recorded gradation image can be suppressed.

In this connection, as the plural number of continuous plural recording sections, a natural number not less than 2 and not more than 16 is preferable and specifically, not more than 8, and further, not more than 4 is preferably.

An example in which, in the recording of the plural pixels forming 1 line in the direction perpendicular to the direction of the relative movement, the elapsed time center of gravity of all of the plural times of recording periods of at least one recording section A1 of the continuous plural recording sections of the recording head exists in the outside of the range from the top to the last in a time series, of all of the plural times of recording periods of the other recording sections A2, is shown in FIG. 17. In this connection, in the following example, an example is described in which an image with 8-bit gradation (the gradation expressed by 8 digits from the $0^{th}$ bit to the $7^{th}$ bit in the binary system) is recorded in each recording period in the image recording apparatus in which 1 pixel is recorded by turning ON or turning OFF the recording of the recording section in each of recording periods of 8 times (N=8) for each recording section of the recording head. Each recording period corresponds to any bit of 8-bit gradation and the length TS(n) of the recording period corresponding to the n-th bit (n is an integer not less than 0 and not more than 7) of the 8-bit gradation is expressed by the following equation.

$TS(n)=2^n$

However, of course, the present invention is not limited to such the premise.

FIG. 17(A) shows an example in which, in the recording of the plural pixels forming 1 line in the direction perpendicular to the direction of the relative movement, all of the plural times of recording periods to record 1 pixel of the recording section A2 ((2) in FIG. 17) is arranged in the elapsed time sequence after all of the plural times of recording periods to record 1 pixel of the recording section A1 ((1) in FIG. 17). Accordingly, in the recording of the plural pixels forming 1 line in the direction perpendicular to the direction of the relative movement, the elapsed time center of gravity CGA1 of all of the plural times of recording periods to record 1 pixel of the recording section A1 ((1) in FIG. 17) does not exist in a range from the top to the last, in a time series, of all of the plural times of recording periods to record 1 pixel of the recording section A2 ((2) in FIG. 17), and the elapsed time center of gravity SGA2 of all of the plural times of recording periods to record 1 pixel of the recording section A2 ((2) in FIG. 17) does not exist in a range from the top to the last, in a time series, of all of the plural times of recording periods to record 1 pixel of the recording section A1 ((1) in FIG. 17).

FIG. 17(B) is an example in which, in the recording of the plural pixels forming 1 line in the direction perpendicular to the direction of the relative movement, the recording periods in sequence from the recording period corresponding to the $7^{th}$ bit to the recording period corresponding to the $4^{th}$ bit to record 1 pixel of the recording period A1 ((1) in FIG. 17), then, in sequence from the recording period corresponding to the $7^{th}$ bit to the recording period corresponding to the $4^{th}$ bit to record 1 pixel of the recording section A2, after that, in sequence from the recording period corresponding to the $3^{rd}$ bit to the recording period corresponding to the $0^{th}$ bit of all of the recording sections are arranged in the elapsed time sequence. Accordingly, in the recording of the plural pixels forming 1 line in the direction perpendicular to the direction of the relative movement, the elapsed time center of gravity CGA1 of all of the plural times of recording periods to record 1 pixel of the recording section A1 ((1) in FIG. 17) does not exist in a range from the top to the last, in a time series, of all of the plural times of recording periods to record 1 pixel of the recording section A2 ((2) in FIG. 17).

Incidentally, as an example of the recording section A1 and the recording section A2, the following are listed, however, the present invention is not limited to those: the recording sections at the even-numbered order or the recording sections at the odd-numbered order from the one end; the recording sections at the order of the multiple of 4 from one end and the other recording sections; the recording sections at the order of the multiple of 4 from one end and the recording sections at the order of (the multiple of 4+2) from one end; the recording sections at the order of (the multiple of 4+1) from one end and the recording sections at the order of (the multiple of 4+3) from one end, or the like.

Item 8

The image recording apparatus according to Item 7, wherein, in the image recording for 1 line, the elapsed time center of gravity of all of the plural times of recording periods of one recording section of 2 adjoining recording sections is not in a range from the top to the last in a time series, of all the plural times of recording periods of the other recording section.

According to the invention described in Item 8, the conspicuousness of the low density or high density line in the gradation image can be more effectively suppressed.

Item 9

The image recording apparatus according to Item 7 or 8, wherein the length and the elapsed time sequence of the plural times of recording periods to record 1 pixel concerning all recording sections are the same.

According to the invention described in Item 9, the conspicuousness of the low density line or high line in the gradation image can be suppressed by a simple control.

This example is shown in FIG. 17(A).

Item 10

The image recording apparatus according to any of Items 1 to 6, wherein the control means controls each recording section of the recording head according to image data for the concerned recording section, by selecting a combination of recording ON or recording OFF in the plural times of recording periods for each pixel.

According to the invention described in Item 10, image recording can be finely conducted corresponding to image data.

Item 11

An image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, according to image data for the concerned recording section, by selecting a combination of recording ON or recording OFF in the plural times of recording periods for each pixel, the image recording apparatus records an image formed of a large number of pixels by the recording operation of each recording section of the recording head, on the image recording medium which is relatively moved by the moving means, wherein, with respect to arbitrary image data having a value, at least, not less than $\frac{1}{10}$ of the maximum image data value, an interval between the elapsed time center of gravity of all of the recording periods of the recording ON and the elapsed time center of gravity of all of the plural times of recording periods is not more than 0.25 times of the pixel interval in the direction of relative movement.

In many cases, it is in an area corresponding to image data having a value, at least, not less than $\frac{1}{10}$ of the maximum image data value that the low density or high density line is generated when the gradation image is recorded. However, according to the invention described in Item 11, with respect to arbitrary image data having a value at least not less than $\frac{1}{10}$ of the maximum image data value, it can be suppressed that the elapsed time center of gravity of the recording of each pixel is largely different from each other depending on image data. Accordingly, it can be suppressed that the positional center of gravity of the recording of each pixel is largely different from each other depending on image data, and thereby, it can be suppressed that the low density or high density line is generated when the recording whose positional center of gravity is largely different from each other, is continued.

Item 12

An image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, according to image data for the concerned recording section, by selecting a combination of recording ON or recording OFF in the plural times of recording periods for each pixel, the image recording apparatus records an image formed of a large number of pixels by the recording operation of each recording section of the recording head, on the image recording medium which is relatively moved by the moving means, wherein, with respect to arbitrary image data having a value, at least, not less than $\frac{1}{10}$ of the maximum image data value, when image recording is conducted in the continuous plural recording sections of the recording head according to the concerned image data, an interval between the elapsed time center of gravity of all of recording periods of the recording ON of the continuous plural recording sections and the elapsed time center of gravity of all the plural times of recording periods of the continuous plural recording sections, is not more than 0.25 times of the pixel interval in the direction of the relative movement.

In many cases, it is in an area corresponding to image data having a value, at least, not less than $\frac{1}{10}$ of the maximum image data value that the low density or high density line is generated when the gradation image is recorded. However, according to the invention described in Item 12, when image recording is conducted in the continuous plural recording sections of the recording head according to the concerned image data, with respect to arbitrary image data having a value at least not less than $\frac{1}{10}$ of the maximum image data value, the elapsed time center of gravity of the recording of the continuous plural recording sections is not different from each other depending on image data, thereby, the positional center of gravity of the recording of the continuous plural recording sections is not different from each other depending on image data. Accordingly, it can be suppressed that the low density or high density line is generated when the recording whose positional center of gravity is largely different from each other, is continued.

In this connection, as the plural number of the continuous plural recording sections, the natural number not less than 2 and not more than 16 is preferable, and specifically, not more than 8, further, not more than 4 is preferable.

Item 13

An image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, according to image data for the concerned recording section, by selecting a combination of recording ON or recording OFF in the plural times of recording periods for each pixel, the image recording apparatus records an image formed of a large number of pixels by the recording operation of each recording section of the recording head, on the image recording medium which is relatively moved by the moving means, wherein a range from the top to the last in a time series, of all of the plural times of recording periods of at least 1 recording section of the continuous plural recording sections of the recording head does not overlap with a range from the top to the last in a time series, of all of the plural times of recording periods of the other recording section.

According to the invention describe din Item 13, the influence of the variation of the elapsed time center of gravity of the recording in each pixel is decreased as the whole, accordingly, the influence of the variation of the positional center of gravity of the recording in each pixel is decreased as the whole, thereby, the conspicuousness of the low density or high density line generated when the recording whose positional center of gravity is largely different, is continued, can be suppressed.

In this connection, as the plural number of the continuous plural recording sections, the natural number not less than 2 and not more than 16 is preferable, specifically, not more than 8, and further, not more than 4 is preferable.

Item 14

An image recording apparatus having a recording head on which a plurality of recording sections are arranged dotted line-like in one or a plurality of rows; a moving means for relatively moving the recording head and an image recording medium; and a control means for controlling each recording section of the recording head so that one pixel is recorded by turning ON or turning OFF recording of the recording section in each of plural times (N times) of recording periods for each recording section of the recording head, according to image data for the concerned recording section, by selecting a combination of recording ON or recording OFF in the plural times of recording periods for each pixel, the image recording apparatus records an image formed of a large number of pixels by the recording operation of each recording section of the recording head, on the image recording medium which is relatively moved by the moving means, wherein, when the gradation image is recorded, in an area corresponding to an arbitrary image data having a value at least not less than $1/10$ of the maximum image data value, an interval of a positional center of gravity of recording between arbitrary pixel groups recorded by the continuous plural recording sections of the recording head adjoining in the direction of the relative movement, recorded on the image recording medium, is not less than 0.75 times and not more than 1.25 times of the pixel interval in the direction of the relative movement.

According to the invention described in Item 14, it can be suppressed that the low density line or the high density line is generated when pixels whose positional center of gravity of image recording is largely different from each other, are continuously recorded.

In this connection, as the plural number of the continuous plural recording sections, the natural number not less than 2 and not more than 16 is preferable, specifically, not more than 8, and further, not more than 4 is preferable.

Item 15

The image recording apparatus according to any of Items 10 to 14, wherein, in 2 adjoining recording sections, when both image data at least corresponding to the concerned recording sections are not more than a predetermined value, the recording periods of recording ON do not overlap with each other in a time series.

According to the invention described in Item 15, the interfering action between adjoining recording sections when the recording periods of recording ON of adjoining recording sections overlap with each other in a time series, can be suppressed, thereby, a fine image can be recorded.

Incidentally, of course, the following are included in a item in which, in 2 adjoining recording sections, when both image data at least corresponding to the concerned recording sections are not more than a predetermined value, the recording periods of recording ON do not overlap with each other in a time series: there is a case in which, in 2 adjoining recording sections, only when both image data at least corresponding to the concerned recording sections are not more than a predetermined value, the recording periods of recording ON of the adjoining recording sections do not overlap with each other in a time series, and when at least one of image data at least corresponding to the concerned recording section exceeds a predetermined value, the recording periods of recording ON of the adjoining recording sections overlap with each other in a time series; or, in 2 adjoining recording sections,(whatever value the image data corresponding to the concerned recording section has), the recording periods of recording ON of the adjoining recording sections do not overlap with each other in a time series, or the like.

Item 16

The image recording apparatus according to Item 15, wherein there is a case in which, in 2 adjoining recording sections, only when both image data at least corresponding to the concerned recording sections are not more than a predetermined value, the recording periods of recording ON of the adjoining recording sections do not overlap with each other in a time series, and when at least one of image data at least corresponding to the concerned recording section exceeds a predetermined value, the recording periods of recording ON of the adjoining recording sections overlap with each other in a time series.

According to the invention described in Item 16, because there is a case in which, when at least one of image data at least corresponding to the concerned recording section exceeds a predetermined value, the recording periods of recording ON of the adjoining recording sections overlap with each other in a time series, high speed image recording can be conducted, and when both image data corresponding to the recording sections in which an interfering action between adjoining recording sections is conspicuous, are not more than a predetermined value, because recording periods of recording ON of the adjoining recording sections do not overlap with each other in a time series, a bad influence of the interfering action between the adjoining recording sections can be suppressed.

Specifically, when the silver halide photographic photosensitive material is exposed, because an influence of variation of the exposure amount is scarcely conspicuous in a low density area or a high density area, a bad influence due to the interfering action between adjoining recording sections can be suppressed so that it is scarcely conspicuous.

Item 17

The image recording apparatus according to Item 15, wherein, in 2 adjoining recording sections, recording periods of recording ON of the adjoining recording sections do not overlap with each other in a time series.

According to the invention described in Item 17, the interfering action between adjoining recording sections when the recording periods of recording ON of the adjoining recording sections overlap with each other in a time series, can be prevented by the simple control, and a fine image can be recorded.

Item 18

The image recording apparatus according to any one of Items 10 to 17, wherein the control means divides each recording section of the recording head into a plurality of blocks so that recording sections which adjoin each other belong to blocks which are different from each other, and controls so that, in both recording sections which belong to blocks different from each other, when both of image data at least corresponding to the concerned recording sections are not more than a predetermined value, the recording periods of recording ON do not overlap with each other in a time series.

According to the invention described in Item 18, it can be conducted simply that, in 2 adjoining recording section, when both of image data at least corresponding to the concerned recording sections are not more than a predetermined value, the recording periods of recording ON do not overlap with each other in a time series. Accordingly, an interfering action exerting between adjoining recording sections when the recording periods of recording ON of the recording sections overlap with each other in a time series, can be suppressed, and a fine image can be recorded.

Item 19

The image recording apparatus according to Item 18, wherein, with respect to the elapsed time sequence m (m is an integer not less than 0 and not more than N−1) of each recording period in recording of each pixel, the length $TB1(m)$ of the recording period of the concerned order in a recording section B1 belonging to one block in the plural blocks is different from the length $TB2(m)$ of the recording period of the concerned order in a recording section B2 belonging to other block.

According to the invention described in Item 19, even when the gradation image is recorded, the elapsed time center of gravity of recording is averaged in the recording sections belonging to the plural blocks, and accordingly, the positional center of gravity is averaged, thereby, generation of the low density or high density line in the recorded gradation image can be suppressed.

Item 20

The Image recording apparatus according to Item 19, wherein, with respect to the elapsed time sequence m (m is an integer not less then 0 and not more than N−1), the length $TB1(m)$ of the recording period of the concerned order in the recording section B1 is symmetrical with the length $TB2(m)$ of the recording period of the concerned order in the recording section B2.

According to the invention described in Item 20, even when the gradation image is recorded, the elapsed time center of gravity of the recording is finely averaged between the recording section B1 and the recording section B2, and accordingly, the positional center of gravity of the recording is finely averaged, thereby, generation of the low density or high density line in the recorded gradation image can be more effectively suppressed.

In this connection, the description in which, with respect to the elapsed time sequence m (m is an integer not less then 0 and not more than N−1), the length $TB1(m)$ of the recording period of the concerned order in the recording section B1 is symmetrical with the length $TB2(m)$ of the recording period of the concerned order in the recording section B2, means that, with respect to an arbitrary p (p is an integer not less than 0 and not more than N−1), $TB1(p)=TB2(N-1-p)$ is satisfied.

Item 21

The image recording apparatus according to Item 19 or 20, wherein, in the recording of each pixel of the plural pixels forming 1 line in the direction perpendicular to the direction of relative movement, the control means controls each recording section of the recording head so that the elapsed time center of gravity of all of the plural times of recording periods of the recording section belonging to at least 1 block of the plural blocks is outside of a range from the top to the last, in a time series, of all of the plural times of recording periods of the other recording sections.

According to the invention described in Item 21, an influence of variation of the elapsed time center of gravity of recording of each pixel is decreased as a whole, thereby, even when the gradation image is recorded, the conspicuousness of the low density or high density line in the recorded gradation image can be suppressed.

Item 22

The image recording apparatus according to any one of Items 1 to 21, wherein the recording section is a light emitting section, the image recording medium is the photosensitive material, the recording period is an exposure period, the recording ON is the exposure ON, and the recording OFF is the exposure OFF.

According to the invention described in Item 22, it can be suppressed that the elapsed time center of gravity of exposure of each pixel is largely different from others, and accordingly, it can be suppressed that the positional center of gravity of exposure of each pixel is largely different from others. Thereby, generation of the low density or high density line caused when pixels in which the positional center of gravity of image recording is largely different from each other, are continuously recorded, can be suppressed.

Item 23

The image recording apparatus according to Item 22, wherein the image recording medium is silver halide photographic photosensitive material.

When a gradation image is recorded, a phenomenon that the high density or low density line which does not exist in the original gradation image, is generated during recording, is conspicuous when the image recording medium is silver halide photosensitive material. However, according to the invention described in Item 23, generation of the low density or high density line caused when an pixel whose positional center of gravity is largely different from others, is continuously recorded, can be suppressed. Further, in the case of silver halide photographic photosensitive material, because variation of the exposure amount is not conspicuous in the low density area and the high density area, an image whose positional center of gravity is largely different from others, may be made so that it is not continuously recorded only in an intermediate density area. Accordingly, the conspicuousness of the low density or high density line caused by continuously recording an image whose positional center of gravity is largely different from others, can be simply prevented.

Item 24

The image recording apparatus according to any one of Items 1 to 23, wherein, with respect to the order n (n is an integer not less than 0 and not more than N−1) of shortness of recording periods in the plural times of recording periods, the length $TS(n)$ of each recording period satisfies the following equation.

$$TS(n) = \alpha \times 2^n + \beta(n) + \gamma(n)$$

Where, $\alpha$ is a coefficient which does not depend on n, and is a positive real number. $\beta(n)$ is a positive real number which satisfies $\beta(n-1) \geq \beta(n)$ with respect to an arbitrary n not less than 1, and satisfies $$0.1 \times \alpha \times 2^{N-1} > \beta(0) > \beta(N-1)$$

and $\gamma(n)$ is a real number whose absolute value is not more than $(\alpha \times 2^n + \beta(n))/100$ with respect to an arbitrary n.

According to the invention described in Item 24, an influence of switching characteristics of each recording section can be decreased, and thereby, higher quality image recording can be conducted, and image recording of gradation can be more finely conducted.

Specifically, when the image recording medium is silver halide photographic image recording medium, an influence of a multiple exposure effect and reciprocity law failure characteristics which are specific to silver halide photographic photosensitive material, can be finely corrected, thereby, higher quality image recording can be conducted, and image recording of gradation can be more finely conducted. Explanation of terminology or the like.

As a phrase that a plurality of recording sections are arranged dotted line-like in one or a plurality of rows, the following are cited: as shown by (a) in FIG. 1, a plurality of recording sections are arranged dotted line-like in 1 row; as shown by (b) in FIG. 1, a plurality of recording sections are arranged dotted line-like in 2 lows; as shown by (c) in FIG. 1, a plurality of recording sections are arranged dotted line-like in 3 rows, or the like. In this connection, in (a), (b), (c) in FIG. 1, the plural rows of recording sections are arranged in positions different form each other with respect to the arrangement direction, however, the plural rows of recording sections may be arranged in the same positions. Further, the shape of a dot in a dotted line may be any of circular shape, rectangular shape, triangular shape, or the like. Still further, both of adjoining recording sections arranged dotted line-like may be separated from each other, or in contact with each other.

Further, as the recording head on which a plurality of recording sections are arranged dotted line-like in one or a plurality of rows, the following are listed: an LED array; a vacuum fluorescent printing head (VFPH); a PLZT shutter array fitted before a light source; a liquid crystal array fitted before a light source; a recording head on which a plurality of light emitting sections are arranged dotted line-like in one or plural rows, such as the other end of optical fiber group whose one end is connected to each of recording operation sources, and which is arranged in one or plurality of rows; an ink jet printing head on which a plurality of liquid-drop jetting sections are arranged dotted line-like in one or a plurality of rows; a heating head on which a plurality of heating sections in a thermal sublimation type printer, a thermal transfer type printer, or the like, are arranged dotted line-like in one or plurality of rows; or similar recording heads. Further, as a recording section in a phrase that the recording head on which a plurality of recording sections are arranged dotted line-like in one or a plurality of rows, the following are listed: an LED light emitting element in the LED array; a fluorescent substance light emitting element of the vacuum fluorescent printing head (VFPH); each shutter of the PLZT shutter array fitted before a light source; each liquid crystal shutter of the liquid crystal array fitted before a light source; a light emitting section of the recording head on which a plurality of light emitting sections are arranged dotted line-like in one or plural rows, such as the other end of optical fiber group whose one end is connected to each of recording operation sources, and which is arranged in one or plurality of rows; a liquid-drop jetting section of the ink jet printing head on which a plurality of liquid-drop jetting sections are arranged dotted line-like in one or a plurality of rows; a heating section of the heating head on which a plurality of heating sections in a thermal sublimation type printer, a thermal transfer type printer, or the like, are arranged dotted line-like in one or plurality of rows; or similar recording sections.

Adjoining recording sections means the recording sections which adjoin in the arrangement direction, that is, in FIG. 1(a), the recording section No. 1 and the recording section No. 2 are recording sections adjoining each other, and also the recording section No. 2 and the recording section No. 3 are recording sections adjoining each other; in FIG. 1(b), the recording section No. 1 and the recording section No. 2 are recording sections adjoining each other, and also the recording section No. 2 and the recording section No. 3 are recording sections adjoining each other; and in FIG. 1(c), the recording section No. 1 and the recording section No. 2, and the recording section No. 2 and the recording section No. 3 are recording sections adjoining each other, and also the recording section No. 3 and the recording section No. 4 are recording sections adjoining each other.

The gradation image means an image obtained when an image is recorded by increasing or decreasing the image data value by 1 for every 1 line advancing in the direction of the relative movement.

The control means has preferably a ROM in which the content of control is stored. Thereby, an amount of operations necessary at the time of image recording is reduced, so that high speed image recording can be conducted.

A phrase that, with respect to the elapsed time sequence m (m is an integer not less than 0 and not more than N−1) of each recording periods in recording of each pixel, the length T(m) of the recording period is increased monotonously, means that the length T(m) of each recording period satisfies the following relationship.

$$T(1) \leq T(2) \leq \ldots \leq T(N-2) \leq T(N-1)$$

Further, A phrase that, with respect to the elapsed time sequence m (m is an integer not less than 0 and not more than N−1) of each recording periods in recording of each pixel, the length T(m) of the recording period is decreased monotonously, means that the length T(m) of each recording period satisfies the following relationship.

$$T(1) \geq T(2) \geq \ldots \geq T(N-2) \geq T(N-1)$$

Incidentally, the length T(m) of each recording period means the length of time of recording ON or recording OFF in each recording period. For example, in the case of FIG. 15(E), the length T(19 of the recording period corresponding to the $6^{th}$ bit is the length of time between the top time TP2 and the last time TP3 of the recording period corresponding to the $6^{th}$ bit because the recording period corresponding to the $6^{th}$ bit is a continuous period, however, the length T(2) of the recording period corresponding to the $7^{th}$ bit is the length of time of summation of the length of time between the top time TP1 of the first half portion of the recording period corresponding to the $7^{th}$ bit and the last time TP2, and the length of time between the top time TP3 of the second half portion of the recording period corresponding to the $7^{th}$ bit and the last time TP4, because the recording period corresponding to the $7^{th}$ bit is intermittently divided into the first half portion and the second half portion.

All of the plural times of recording periods means a period in which the plural times of recording periods are collected together. The elapsed time center of gravity of all of the plural times of recording periods means the elapsed time center of gravity of the period in which the plural times of recording periods are collected together. A phrase "from the top to the last, in a time series, of all of the plural times of recording periods" means "from the top of the leading recording period in the plural times of recording periods to the last of the trailing recording period in the plural times of the recording periods".

BRIEF DESCRIPTION OF THE DRAWINGS

FIGS. 17(A) and 17(B) are views showing an example in which, in the exposure for 1 line, a weight point of the overall light emitting control time T(m)(m is an integer not less than 0 and not more than N-1) of the plural times (N times) of exposure timing of at least one light emitting section of adjoining plural (not more than a predetermined number) light emitting sections exists outside of a range from the leading edge to the trailing edge of the overall light emitting control time T(m)(m is the order of each exposure timing in the exposure of each pixel, and is an integer not less than 0 and not more than N-1) of the plural times (N times) of exposure timing of the other light emitting sections.

DETAILED DESCRIPTION OF THE PREFERRED EMBODIMENT

An example of embodiments relating to the present invention will be shown as a preferred embodiment below, however, the present invention is not limited to that. Further, in the preferred embodiment, there are conclusive expression relating to technological terms, or the like, however, it shows a preferred example of the present invention and does not limit meanings of terms and a technological scope of the present invention.

EXAMPLE 1

Figure 2:
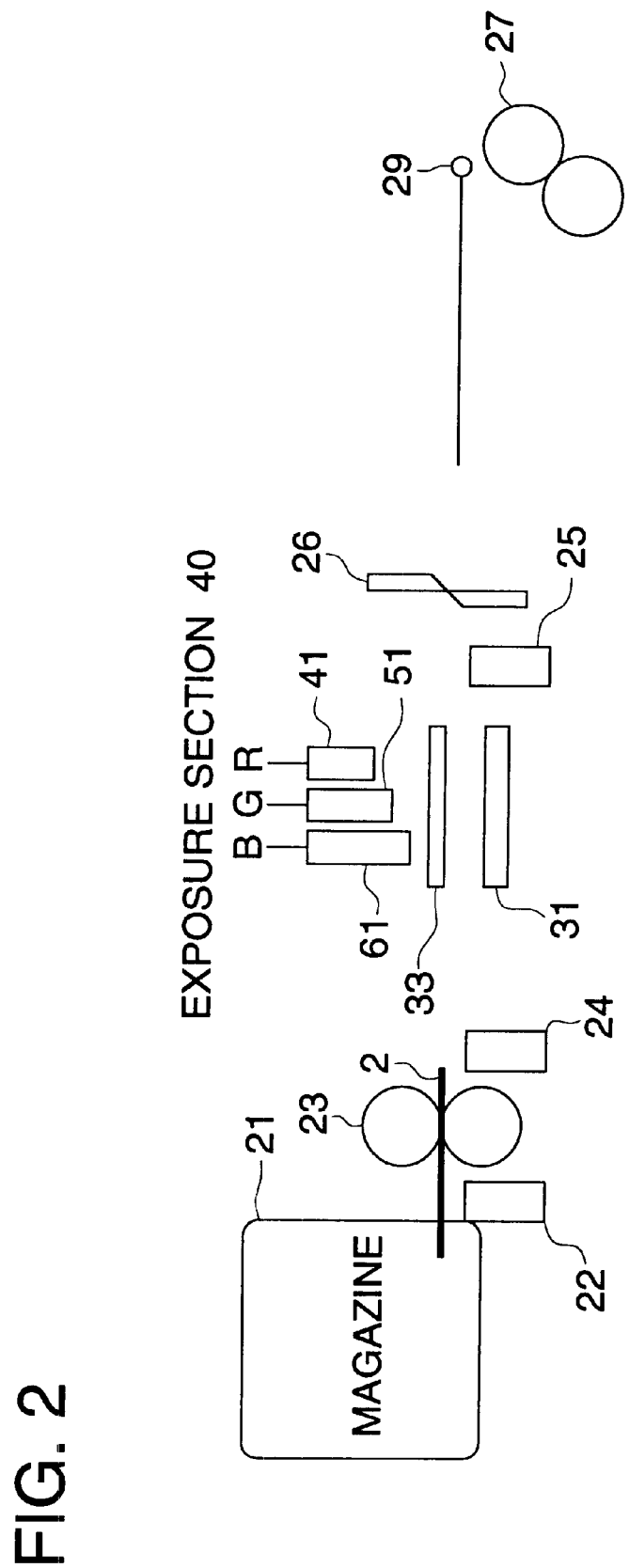
FIG. 2 is a front view of a general structure of an image recording apparatus of Example 1.
Figure 3:
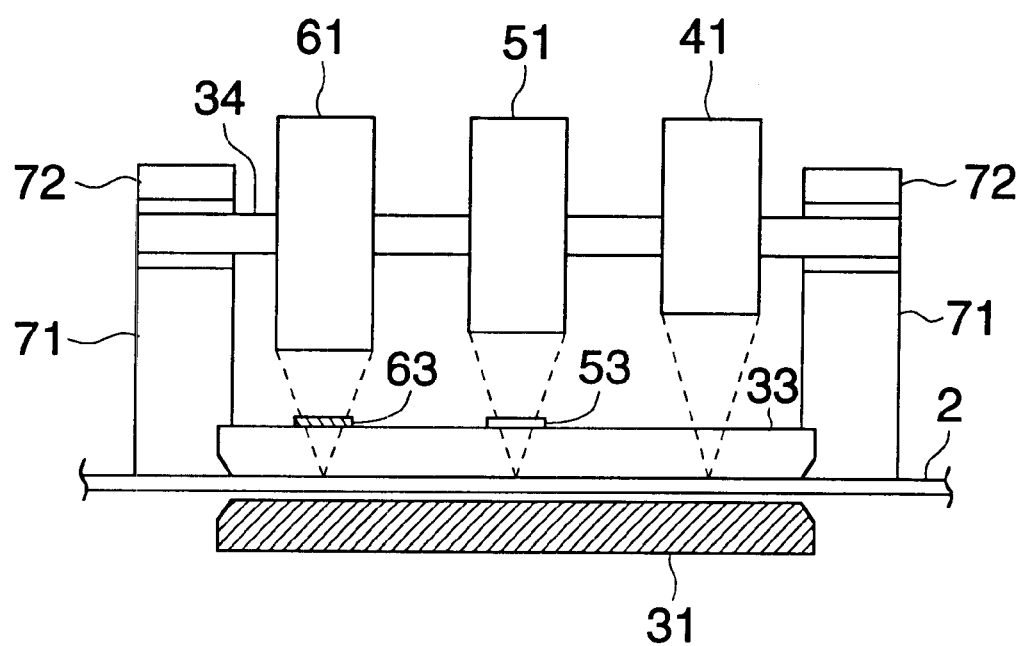
FIG. 3 is a front view of a general structure of an exposure section of an image recording apparatus of Example 1.

A front view of the outline structure of an image recording apparatus of the present example is shown in FIG. 2. Further, a front view of the outline structure of an exposure section of the image recording apparatus of the present example is shown in FIG. 3.

The image recording apparatus of the present example has a red light-use recording head 41, green light-use recording head 51, blue light-use recording head 61, an exposure section 40 to expose printing paper 2, a conveyance roller pair 23 and a conveyance roller pair 27 which are conveyance means for conveying the printing paper 2 exposed by the exposure section 40, a cutter 26 to cut off the printing paper 2 exposed by the exposure section 40 from the remaining portion of the printing paper 2, a development processing section (not shown) to developing-process the printing paper 2 cut off by the cutter 26, and a flapping plate 29 to guide the printing paper 2 to the development processing section when it is lifted, and not to guide the printing paper 2 to the development processing section when it is lowered. In this connection, the printing paper 2 is a color printing paper to obtain a positive print from negative film, and print-use silver halide color photographic photosensitive materials having a layer which is exposed by the red light and on which cyan comes out, a layer which is exposed by green light and on which magenta comes out, and a layer which is exposed by blue light and on which yellow comes out.

Further, the present image recording apparatus is provided with a magazine setting section which can set a magazine 21 in which a roll-like printing paper 2 is accommodated, in a predetermined direction and a position; a magazine detecting sensor 22 to detect whether the magazine 21 is set in the magazine setting section or not; a standby sensor 24 to detect passage of the leading edge or trailing edge of the printing paper 2 drawn from the magazine 21; and a position sensor 25 to detect the leading edge of the printing paper 2 and to detect whether the printing paper 2 exists at the detecting position of the sensor or not.

The leading edge position of the printing paper 2 is detected by information of the position sensor 25 and information of a counter for a driving pulse of a driving step motor of the conveyance roller pair 23. The leading edge position of the detected printing paper 2 is used for cutting the printing paper 2 or positioning the leading edge of the printing paper 2 from the position of the standby sensor 24 to the standby position of the magazine 21 side.

The exposure section 40 exposes an image on the printing paper 2 by the red light-use recording head 41, green light-use recording head 51 and blue light-use recording head 61. In the exposure section 40, a transparent glass plate 33 is provided between the red light-use recording head 41, green light-use recording head 51, blue light-use recording head 61, and the printing paper 2. The lower end surface of the transparent glass plate 33 is the reference surface for exposure of the red light-use recording head 41, green light-use recording head 51 and blue light-use recording head 61. The printing paper 2 is positioned on the reference surface by the transparent glass plate 33, so that a blur of the image by shifting of the exposure surface from the reference surface is prevented. Further, a damage of the recording head or the printing paper 2 caused by contact of the printing paper 2 with the red light-use recording head 41, green light-use recording head 51 and blue light-use recording head 61 is prevented, and it is prevented that it becomes an obstacle for conveyance and causes nonuniformity in conveyance, or jamming.

A conveyance roller pair 23 to draw and return the printing paper from or to the magazine 21 set in a predetermined position is provided in the image recording apparatus. The subsidiary scanning is conducted when the printing paper 21 is conveyed to return to the magazine 21 by the conveyance roller pair 23, and the printing paper 2 which is being conveyed, is exposed by the exposure section 40 in the primary scanning direction. A cutter 26 is provided between the exposure section 40 and the development processing section in the image recording apparatus. A portion of the exposed leading edge side of the printing paper 2 is cut off from the unexposed remaining portion of the printing paper 2. Then, the printing paper 2 which is exposed and cut off, is development-processed by the development processing section.

In the exposure section 40, a fixing plate 34 to fix the red light-use recording head 41, green light-use recording head 51 and blue light-use recording head 61 is provided.

The image recording apparatus has a pressing member 31 to position the photosensitive surface of the printing paper 2 on the lower end surface of the transparent glass plate 33 when the printing paper 2 is exposed. When the printing paper 2 is exposed, the pressing member 31 presses the printing paper 2 on the transparent glass plate 33, and the pressing member 31 is separated from the transparent glass plate 33 in other cases.

Only during exposure, the printing paper 2 is pressed by the pressing member 31, and when being pressed, the printing paper 2 is conveyed between the pressing member 31 and the transparent plate in such a manner that it is drawn from between the pressing member 31 and the transparent plate.

Figure 1:
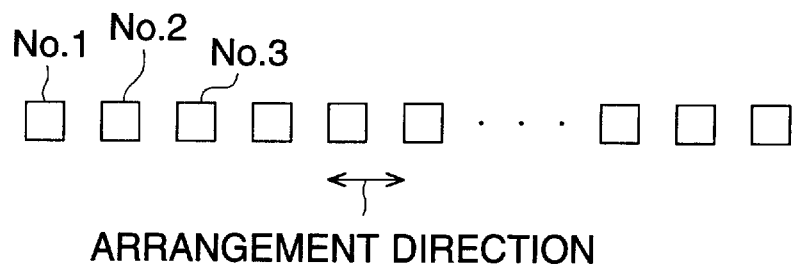
FIGS. 1(a) to 1(c) are views showing an example in which a plurality of recording sections are arranged dotted line-like in one or a plurality of rows.
Figure 1:
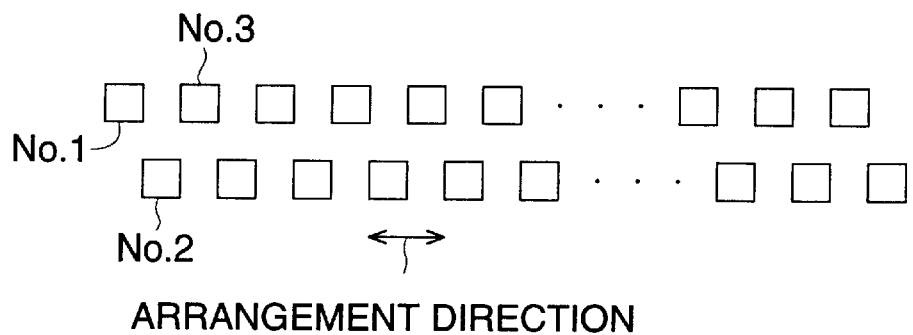
Figure 1:
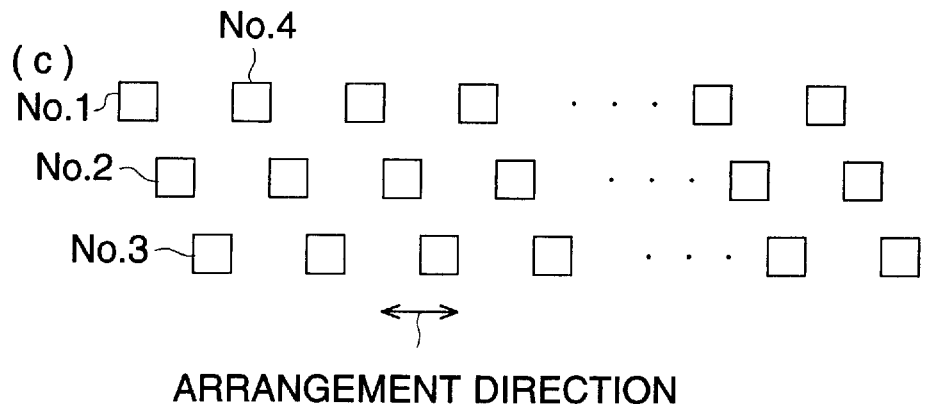

The red light-use recording head 41 has a light emitting element group in which 300 dpi 2560 pieces of LED light emitting elements, whose peak wavelength is 665 nm and which is used as a light emitting section, are arranged dotted line-like on the linear line with a uniform interval as shown in FIG. 1(a), and a Selfoc lens array which is an aggregation of lenses by which light emission of each LED light emitting element is respectively focused on the photosensitive surface of the printing paper 2, is arranged at a predetermined position of the photosensitive material side of the light emitting element group.

Figure 4:
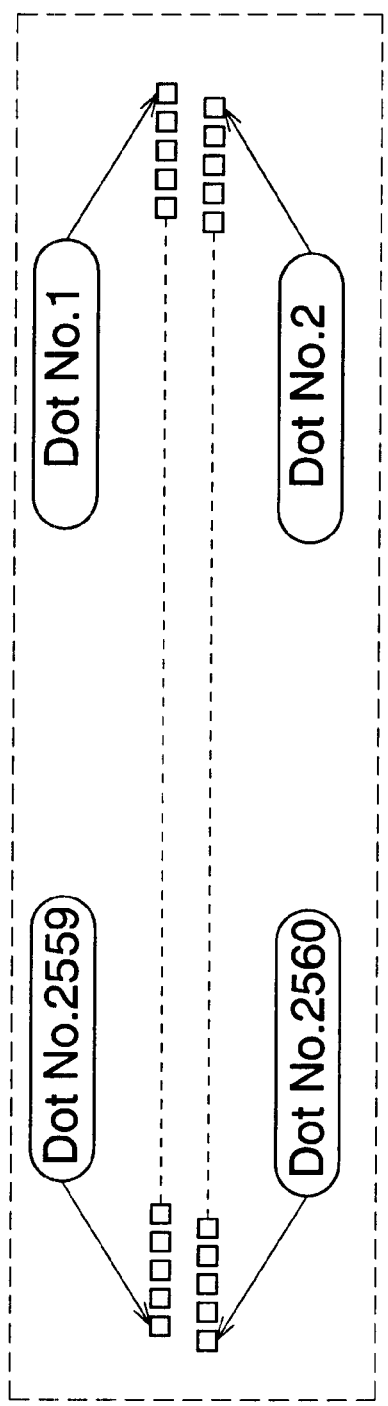
FIG. 4 is a view of a conceptual arrangement of a light emitting section of a VFPH used as a blue light-use recording head and a green light-use recording head of the image recording apparatus of Example 1.

Both green light-use recording head 51 and blue light-use recording head 61 are fluorescent display tube type vacuum fluorescent print heads (VFPH) having fluorescent light emitting elements which emit the light of both wavelength areas of blue light and green light. A fluorescent substance light emitting element of a zinc oxide fluorescent substance (ZnO:Zn) which can simultaneously emit a light, is used as an light emitting section, and as shown in FIG. 4, the recording head has an light emitting element group in which 300 dpi 2560 light emitting elements are arranged, and a Selfoc lens array which is an aggregation of lenses by which light emission of each fluorescent substance light emitting element is respectively focused on the photosensitive surface of the printing paper 2, is arranged at a predetermined position of the photosensitive material side of the light emitting element group. As shown in FIG. 4, odd-numbered light emitting sections (Dot No. 1–No. 2559) and even-numbered light emitting sections (Dot No. 2–No. 2560) are respectively arranged dotted line-like on liner lines in 2 rows with an equal interval, and by arranging 2 rows of light emitting section groups zigzag, the light emitting element group is formed in which 300 dpi 2560 light emitting elements are arranged.

A blue filter (LEE filter sold by Konica color equipment Co.) is provided on the surface of the transparent glass plate 33 opposite to the blue light-use recording head 61 so that exposure is conducted by the blue light, and a yellow filter (HT015 soled by Konica color equipment Co.) is provided on the surface of the transparent glass plate 33 opposite to the green light-use recording head 51 so that exposure is conducted by the green light.

The recording head is provided.

Figure 5:
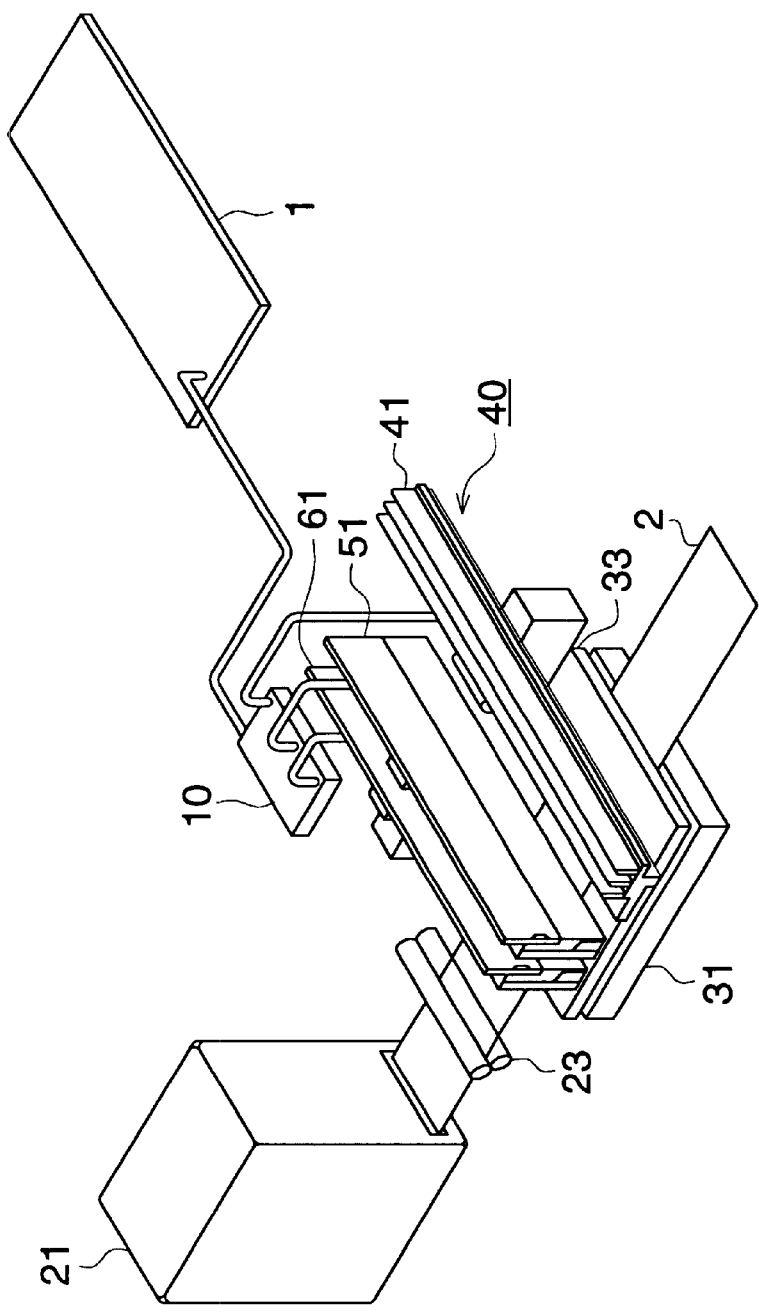
FIG. 5 is an outline perspective view of the periphery of the exposure section of the image recording apparatus of Example 1.

Next, the circuit structure of the image recording apparatus of the present example will be described according to FIG. 5 which is a perspective view of the outline relating to the exposure section 40 and its peripheral circuit.

The image processing control circuit 1 converts inputted color image data into image data for each primary color and transmits it to the signal processing section 10. The signal processing section 10 has a signal processing circuit for each primary color of B, G, R therein. The signal processing circuit for each primary color of the signal processing section 10 is respectively connected to the recording head 41, 51 or 61 which conducts exposure relating to the corresponding primary color. The signal processing section 10 generates each kind of signal for effective image recording of 1 line every time when a START signal is inputted which is transmitted every time when a predetermined amount of printing paper 2 is conveyed.

That is, the signal processing circuit for blue light and the signal processing circuit for green light in the signal processing section 10 generate 1 bit serial image data AL1, AL2, AL3, AL4, AR1, AR2, AR3, AR4, a latch control signal LOAD, an output control signal ESTBR, ESTBL, and a clock signal for data shift CLK from inputted image data, according to the START signal transmitted every time when a predetermined amount of printing paper 2 is conveyed, and send them to the recording heads 51 and 61. Then, the recording heads 51 and 61 cause each light emitting section to emit a light according to the sent signal.

Further, in the same manner, the signal processing circuit for red light in the signal processing section 10 also generates 1 bit serial image data, a latch control signal, an output control signal, a clock signal for data shift from inputted image data, according to the START signal transmitted every time when a predetermined amount of printing paper 2 is conveyed, and sends them to the recording head 41. Then, the recording head 41 causes each light emitting section to emit a light according to the sent signal.

Figure 6:
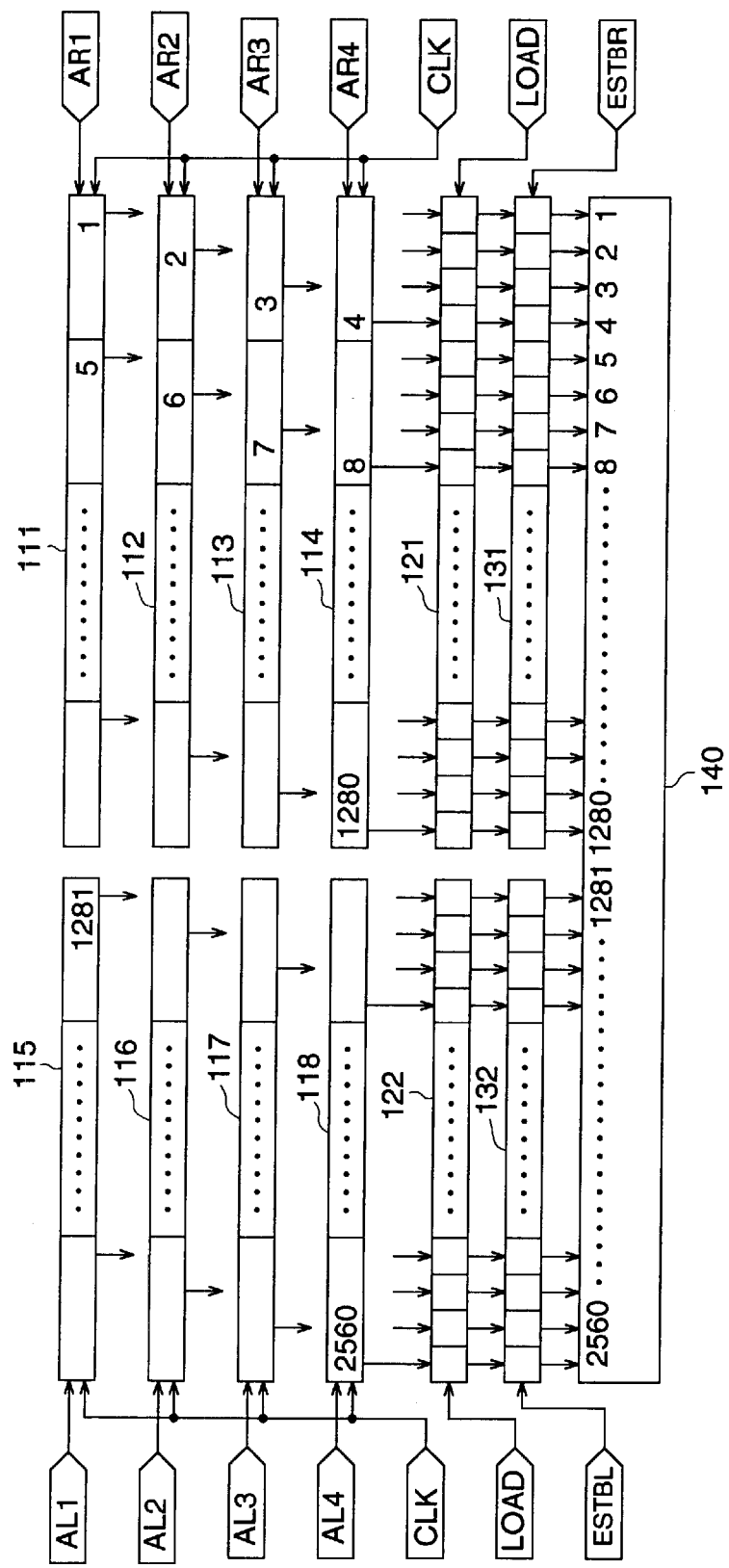
FIG. 6 is a circuit diagram of a recording head of the image recording apparatus of Example 1.

Next, circuits inside the green light-use recording head 51 and the blue light-use recording head 61 will be explained according to FIG. 6 which is a circuit diagram of the circuits inside the recording heads 51 and 61. The recording heads 51 and 61 have therein shift registers 111–118, latch circuits 121, 122, gates 131, 132, and a recording head 140. A signal receiving section 71 receives 1 bit serial image data AL1, AL2, AL3, AL4, AR1, AR2, AR3, AR4, the latch control signal LOAD, output control signals ESTBR, ESTBL, and the clock signal for data shift CLK from the signal processing circuit of the signal processing section 10, and supplies them to each section as shown in FIG. 6.

Then, 1 bit serial data AR1 is set to the shift register 111, 1 bit serial data AR2 is set to the shift register 112, 1 bit serial data AR3 is set to the shift register 113, 1 bit serial data AR4 is set to the shift register 114, 1 bit serial data AL1 is set to the shift register 115, 1 bit serial data AL2 is set to the shift register 116, 1 bit serial data AL3 is set to the shift register 117, and 1 bit serial data AL4 is set to the shift register 118, in timed relationship with the clock signal CLK for data shift.

The latch circuit 121 latches 1 bit serial image data AR1–AR4 which are set to shift registers 111–114, according to the latch control signal LOAD. The latch circuit 122 latches 1 bit serial data AL1–AL4 which are set to shift registers 115–118, according to the latch control signal LOAD.

A gate 131 generates 1 bit driving signal of L or H from the output control signal ESTBR for each light emitting section, according to 1 bit serial image data latched by the latch circuit 121, and sends it to the recording head 140. A gate 132 generates 1 bit driving signal of L or H from the output control signal ESTBL for each light emitting section, according to 1 bit serial image data latched by the latch circuit 122, and sends it to the recording head 140. The recording head 140 drives each light emitting section by the driving signals generated by gates 131 and 132.

Incidentally, the output control signal ESTBL is 1 bit signal of H or L, and the gate 132 is driven by 1 bit serial image data when the output control signal ESTBL is H, and generates the driving signal of all L when the output control signal ESTBL is L. In the same manner, the output control signal ESTBR is 1 bit signal of H or L, and the gate 131 is driven by 1 bit serial image data when the output control signal ESTBR is H, and generates the driving signal of all L when the output control signal ESTBR is L.

Next, each signal processing circuit for green light and blue light of the signal processing section 10 which generates from inputted image signal, 1 bit serial image data AL1, AL2, AL3, AL4, AR1, AR2, AR3, AR4, the larch control signal LOAD, output control signals ESTBR, ESTBL, and clock signal CLK for data shift, which are sent to the green light-use and blue light-use recording heads 51 and 61, will be explained according to FIG. 7 which is an outline block diagram of the image processing section 10.

The signal processing circuit has a multiplier 11 to multiply correction data and image data sent from the image processing control circuit 1, in order to correct unevenness of light emitting characteristics of each light emitting section of the recording head; a correction data memory 12 to store the correction data sent from the image processing control circuit 1 and to supply it to the multiplier 11; a correction control section 13 to receive the control signal from the image processing control circuit 1 and the status signal of the memory writing control section 14, and to control the multiplier 11 and the correction data memory 12 corresponding to the control signal and the status signal and to send the status signal to the image processing control circuit 1; a memory writing control section 14 to write the image data corrected by the multiplier 11, in memories corresponding to each shift register of the recording head, by distributing the data to the memories; a memory group which is provided corresponding to each shift register of the recording head and stores 12 bit image data (MaR1, MaR2, MaR3, MaR4, MaL1, MaL2, MaL3, MaL4, MbR1, MbR2, MbR3, MbR4, MbL1, MbL2, MbL3, MbL4); a memory reading control section 15 to read 1 bit serial image data for each bit from each memory according to the clock signal CLK for data shift sent from a signal generation control section 16; an oscillator 17 to generates pulses having a predetermined frequency (for example, 20 MHz, that is, the period is 0.05 μsec.); and a signal generation control section 16 which generates the latch control signal LOAD and sends it to the latch circuits 121 and 122, according to the oscillation pulse from the oscillator 17 and the START signal generated each time when a predetermined amount of printing paper 2 is conveyed, and generates the output signal ESTBR and sends it to the right gate 131, and generates the output control signal ESTBL and sends it to the left gate 132, generates the clock signal CLK for data shift and sends it to each of shift registers 111–118, and sends 1 bit serial image data AR1, AR2, AR3, AR4, AL1, AL2, AL3, AL4, corresponding to each of shift registers 111–118, which are read by the memory reading control section 15, to respectively corresponding shift registers 111–118.

Then, the image data sent from the image processing control circuit 1 is multiplied by correction data in the multiplier 11, and corrected. The corrected image data is written in memories corresponding to each shift register of the recording head by the memory writing control section 14, by distributing the image data to memories.

The memory writing control section 14, the memory group, and memory reading control section 15 are used for generating 1 bit serial image data in each bit stage, that is, the memory reading control section 15 controls an address to read data from the memory group, and thereby, initially, as described later, in order to select a generation method of the serial image data at timing (1)–(4), in the 12 bit multi-contrast image data, the $11^{th}$ bit and the $10^{th}$ bit are read, and next, the $0^{th}$ bit, the $2^{nd}$ bit, the $4^{th}$ bit, the $6^{th}$ bit, the $8^{th}$ bit, the $9^{th}$ bit, the $7^{th}$ bit, the $5^{th}$ bit, the $3^{rd}$ bit, the $1^{st}$ bit, are successively read in the above order for each bit stage, so that 1 bit serial image data in each bit stage is generated.

In this connection, the 12 bit multi-contrast image data is the image data in which the gradation is expressed by 12 bits from the $11^{th}$ bit to the $0^{th}$ bit in the binary system. The $11^{th}$ bit which is the highest rank bit, is the largest digit and the $0^{th}$ bit which is the lowest rank bit, is the smallest digit. The expression that the memory reading control section 15 reads the 12 bit multi-contrast image data by each bit stage in the above-described order, means that a value of 1/0 of each digit of the 12 bit multi-contrast image data in the binary system is read by each 1 digit in the above-described order.

The memory group has memories for each shift registers 111–118, and when the memory reading control section 15 controls the address to read data from each memory, the 12 bit multi-contrast image data stored in each memory is read for each bit stage in the order of the $11^{th}$ bit, the $10^{th}$ bit, the $0^{th}$ bit, the $2^{nd}$ bit, the $4^{th}$ bit, the $6^{th}$ bit, the $8^{th}$ bit, the $9^{th}$ bit, the $7^{th}$ bit, the $5^{th}$ bit, the $3^{rd}$ bit, the $1^{st}$ bit, and thereby, the 1 bit serial image data in each bit stage, AR1, AR2, AR3, AR4, AL1, AL2, AL3, AL4 can be generated.

The memory group is divided into 2 systems of a memory system a composed of MaR1, MaR2, MaR3, MaR4, MaL1, MaL2, MaL3, and MaL4, and a memory system b composed of MbR1, MbR2, MbR3, MbR4, MbL1, MbL2, MbL3, and MbL4. Then, the status in which the memory reading control section 15 reads data from the memory system b simultaneously when the memory writing control section 14 writes data in the memory system a, and the status in which the memory reading control section 15 reads data from the memory system a simultaneously when the memory writing control section 14 writes data in the memory system b, are alternately repeated. For this operation, the memory writing control section 14 sends a writing end signal showing that writing into the memory is completed, to the memory reading control section 15, and after the memory reading control section 15 receives the writing end signal, it starts reading from another memory system. The memory reading control section 15 sends a reading end signal showing that reading from memory is completed, to the memory writing control section 14, and after the memory writing control section 14 receives the reading end signal, it starts writing into another memory system. According to these operations, writing timing of the image data of the memory writing control section 14 and reading timing of the image data of the memory reading control section 15 can become independent of each other. Thereby, image data can be sent at high speed.

Then, the memory writing control section 14 generates a status signal showing the status in which writing into the memory was completed and received the reading end signal from the memory reading control section 15, that is, showing the status in which writing of the next image data is possible or not, and send the status signal to the correction control section 13. Then, the correction control section 13 generates the status signal showing the status in which the memory writing control section 14 can write the next image data and the multiplier 11 and the correction memory 12 have no trouble, that is, showing the status in which the next image data can be received or not, and sends the status signal to the image processing control circuit 1.

Figure 8:
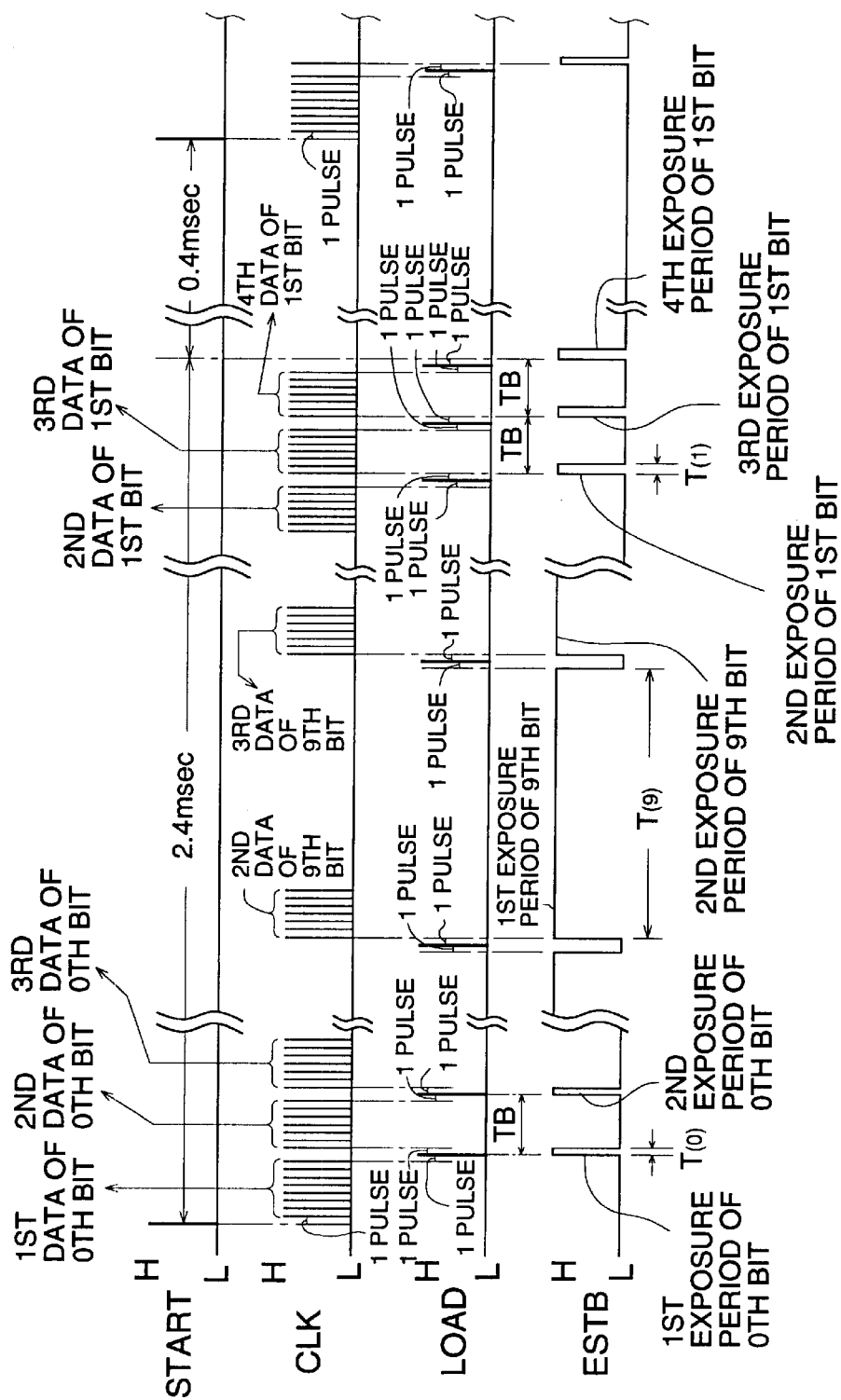
FIG. 8 is a timing chart of a signal from the signal processing section of the image recording apparatus of Example 1.

Further, the signal generation control section 16 generates each signal as shown in FIG. 8 which is a timing chart showing a portion of generation timing of each signal of the signal generation control section 16 of the signal control circuit for blue light and green light.

When the START signal, generated every time when the predetermined amount of printing paper 2 is conveyed, is inputted, the signal generation control section 16 initially causes the CLK signal to generate pulses whose number is equal to the number of pixels of the light emitting section, used for effective image recording, according to the oscillation pulses of the oscillator 17, and sends the $1^{st}$ serial image data of the $0^{th}$ bit to shift registers 111–118. When the CLK signal has completed generation of pulses whose number is equal to the number of pixels of the light emitting section used for effective image recording, the CLK signal becomes the status of L, a preparatory stage is finished, and the pulse of the oscillator 17 is counted by 1.

Next, the following one unit signal generating operation corresponding to each bit is repeated by 4 times for each bit stage in the order of the $0^{th}$ bit, the $2^{nd}$ bit, the $4^{th}$ bit, the $6^{th}$ bit, the $8^{th}$ bit, the $9^{th}$ bit, the $7^{th}$ bit, the $5^{th}$ bit, the $3^{rd}$ bit, the $1^{st}$ bit. That is, the latch control signal LOAD is made to generate one H pulse, and then, the latch control signal LOAD is made to be the status L. Then, when the pulse of the oscillator 17 is counted by 1, the output control signals ESTBR and ESTBL are made to be the status H, and simultaneously, the CLK signal is caused to generate the pulses whose number is equal to the number of pixels of the light emitting section used for effective image recording, and the signal generation control section 16 starts to send the 1 bit serial image data corresponding to the concerned bit to shift registers 111–118. Then, output control signals ESTBR, and ESTBL are made to be the status H, and after the exposure period corresponding to the concerned bit has passed, the output control signals ESTBR and ESTBL are made to be the status L. Then, when the CLK signal has completed generation of the pulses whose number is equal to the number of pixels of the light emitting section used for effective image recording, the CLK signal becomes the status L. Further, after the latch control signal LOAD is caused to generate 1 H pulse and the pulse of the oscillator 17 is counted by 1, the longer period of time between a predetermined interval time TB and the exposure period corresponding to the concerned bit is measured. After that period of time has passed, the pulse of the oscillator 17 is counted by 1, and the latch control signal LOAD is caused to generate 1 H pulse. The above-described operations are 1 unit of signal generating operation, and the 1 unit of signal generating operation is repeated 4 times for each bit stage.

In this connection, in the following 1 unit of signal generating operation corresponding to each bit, detection of the exposure period corresponding to the concerned bit, and detection of the longer period of time between the exposure period corresponding to the concerned bit and a predetermined interval time TB, are conducted by counting the oscillation pulses of the oscillator 17, whose number is corresponding to the length TS(n) of the exposure period corresponding to each bit stage and the predetermined interval time TB, according to the length TS(n) of the exposure period allotted to each of bits from the $9^{th}$ bit to the $0^{th}$ bit, and the predetermined interval time TB, which are recorded in the signal generation control section 16.

Then, at the time TP when the interval time TB in the $4^{th}$ time of the $1^{st}$ bit has passed, all signals are made to be the status of L, and image recording of 1 line of the effective image recording is completed. The time elapsed up to that time is about 2.4 msec, and when about 0.4 msec has passed after that, the next START signal is inputted, and the signal generation control section 16 starts recording of the next line.

Figure 7:
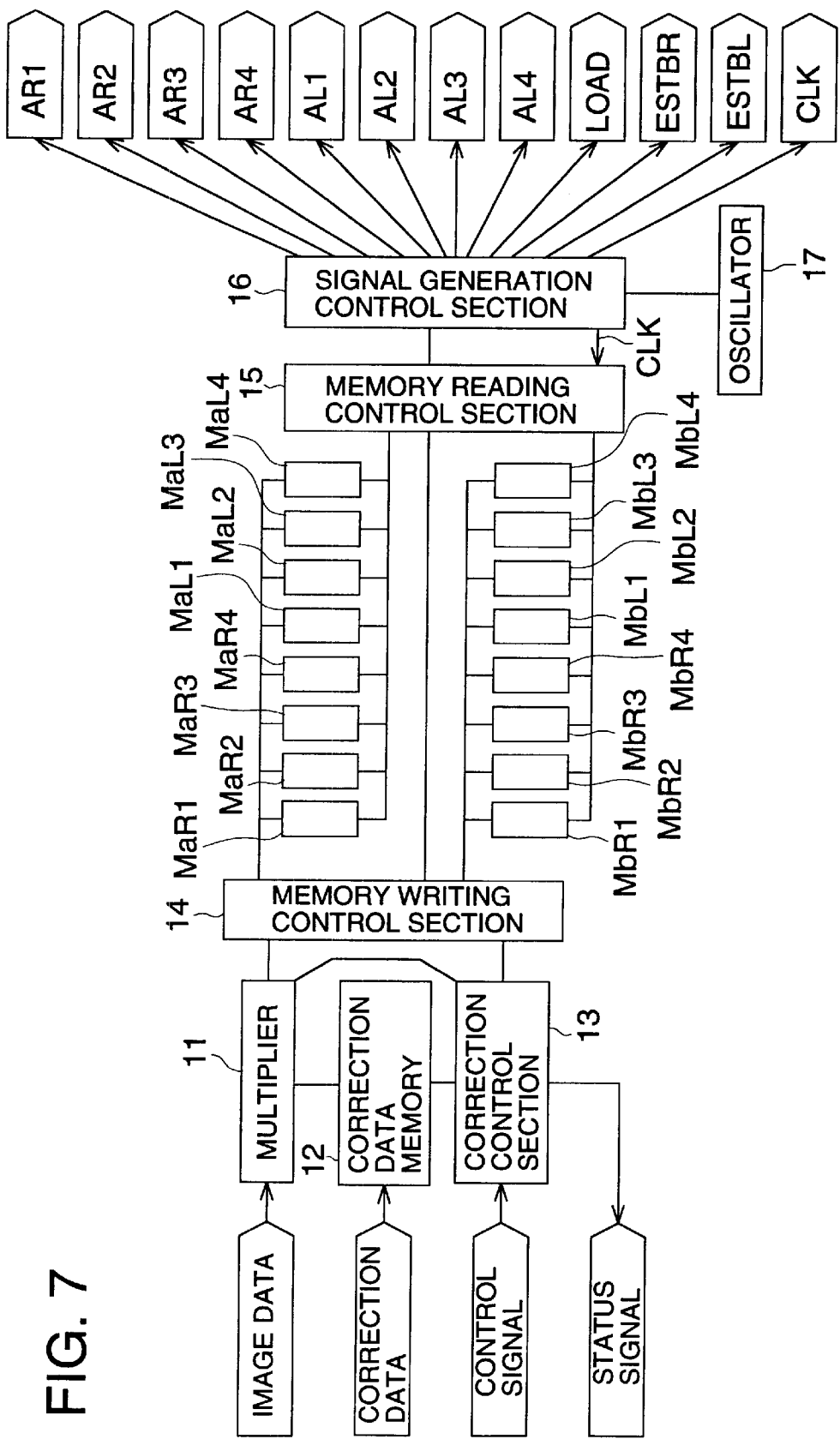
FIG. 7 is a block diagram of a signal processing section of the image recording apparatus of Example 1.

Then, as shown in FIG. 7, after the serial image data has been set in shift registers 111 to 118, the next serial image data is set in the shift registers 111 to 118 while gates 121 and 122 complete the driving operation by the information in which the set serial image data has been latched.

Next, example of the length TS(n) (μsec) of each exposure period will be shown.

The length (μsec) of the exposure period of the $9^{th}$ bit:

$$TS(9)=512\times\alpha$$

The length (μsec) of the exposure period of the $8^{th}$ bit:

$$TS(8)=256\times\alpha$$

The length (μsec) of the exposure period of the $7^{th}$ bit:

$$TS(7)=128\times\alpha$$

The length (μsec) of the exposure period of the $6^{th}$ bit:

$$TS(6)=64\times\alpha$$

The length (μsec) of the exposure period of the $5^{th}$ bit:

$$TS(5)=32\times\alpha$$

The length (μsec) of the exposure period of the $4^{th}$ bit:

$$TS(4)=16\times\alpha$$

The length (μsec) of the exposure period of the $3^{rd}$ bit:

$$TS(3)=8\times\alpha$$

The length (μsec) of the exposure period of the $2^{nd}$ bit:

$$TS(2)=4\times\alpha$$

The length (μsec) of the exposure period of the $1^{st}$ bit:

$$TS(1)=2\times\alpha$$

The length (μsec) of the exposure period of the $0^{th}$ bit:

$$TS(0)=1\times\alpha$$

In this connection, α is a factor determined by the recording head (VFPH), the resolution in the subsidiary scanning direction in image recording, the speed of relative movement of the recording head and photosensitive material, or the like, and in the present example, a factor of 0.15–2.0. Accordingly, these can be expressed by the following equation.

$$TS(n)=\alpha\times 2^n$$

The interval time TB is a period of time to send 1 bit serial image data to the shift registers 111–118 during a period of time between the latch control signal LOAD pulse and the next pulse, that is, a period of time to send 1 bit serial image data to the shift registers 111–118 is added by the margin time (for example, 0.1 μsec). Accordingly, the interval time TB is different depending on the number of pixels of the light emitting section used for effective image recording, and when all light emitting sections of the recording head are used for the effective image recording, (in the present example, the number of pixels are 320 for each shift register), the interval time TB is 16.1 μsec (320×0.05 μsec+0.1 μsec).

The contents of 1 bit serial image data AR1, AR2, AR3, AR4, AL1, AL2, AL3, and AL4, which are sent to shift registers 111–118 4 times for each bit stage from the $9^{th}$ bit to the $0^{th}$ bit, in the order of the $0^{th}$ bit, the $2^{nd}$ bit, the $4^{th}$ bit, the $6^{th}$ bit, the $8^{th}$ bit, the $9^{th}$ bit, the $7^{th}$ bit, the $5^{th}$ bit, the $3^{rd}$ bit, the $1^{st}$ bit will be explained according to FIG. 9 which is a portion of a serial image data transmission timing chart of the signal control circuit for blue light and green light.

Initially, the 1 bit serial image data AL1 and AR1 are generated using the timing (1)–(4) shown in the uppermost column in FIG. 9 as the reference as follows.

When the serial image data of the $11^{th}$ bit of each pixel stored in memories MaL1, MaR1 or memories MbL1, and MbR1 is "0" (light emission is OFF) and the serial image data of the $10^{th}$ bit is "0" (light emission is OFF), (that is, data of the concerned pixel is not less than 0 and not more than 1023), the data of the concerned bit stage stored in the memory at each bit stage from the $9^{th}$ bit to the $0^{th}$ bit is read at the timing(1), and data is set to "0" at other timing (2)–(4), thereby, data of the concerned pixel is produced.

When the serial image data of the $11^{th}$ bit of each pixel stored in memories MaL1, MaR1 or memories MbL1, and MbR1 is "0" (light emission is OFF) and the serial image data of the $10^{th}$ bit is "1" (light emission is ON), (that is, data of the concerned pixel is not less than 1024 and not more than 2047), data is set to "1" at timing (1), and the data of the concerned bit stage stored in the memory at each bit stage from the $9^{th}$ bit to the $0^{th}$ bit is read at the timing(2), and data is set to "0" at other timing (3) and (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "0" (light emission is OFF), (that is, data of the concerned pixel is not less than 2047 and not more than 3071), data is set to "1" at timing (1) and (2), and the data of the concerned bit stage stored in the memory at each bit stage from the $9^{th}$ bit to the $0^{th}$ bit is read at the timing(3), and data is set to "0" at other timing (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "1" (light emission is ON), (that is, data of the concerned pixel is not less than 3072 and not more than 4095), data is set to "1", at timing (1)–(3), and the data of the concerned bit stage stored in the memory at each bit stage from the $9^{th}$ bit to the $0^{th}$ bit is read at the timing(4), thereby, data of the concerned pixel is produced.

Figure 9:
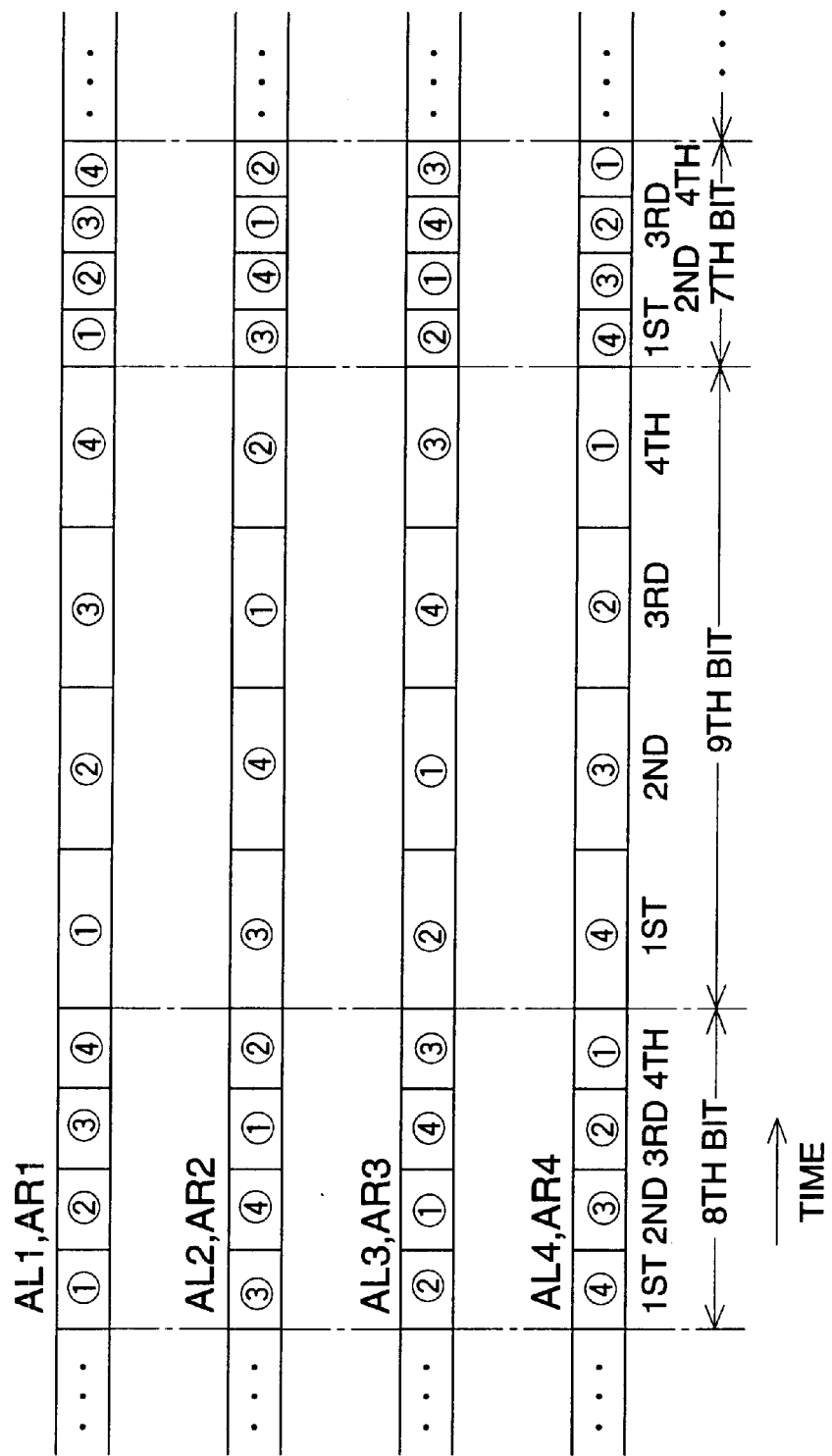
FIG. 9 is a portion of a serial image data transmission timing chart for blue light and green light of Example 1.

Further, the 1 bit serial image data AL2 and AR2 are generated using timing (1)–(4) shown in the second uppermost column in FIG. 9 as the reference from data of each pixel stored in memories MaL2, MaR2 or MbL2, MbR2 in the same manner as the above-description. The 1 bit serial image data AL3 and AR3 are generated using timing (1)–(4) shown in the third uppermost column in FIG. 9 as the reference from data of each pixel stored in memories MaL3, MaR3 or MbL3, MbR3 in the same manner as the above-description. The 1 bit serial image data AL4 and AR4 are generated using timing (1)–(4) shown in the fourth uppermost column in FIG. 9 as the reference from data of each pixel stored in memories MaL4, MaR4 or MbL4, MbR4 in the same manner as the above-description.

According to that, adjoining light emitting sections are simultaneously emitted only when data of the highest rank bit of at least one of light emitting section of the adjoining light emitting sections is "1" (light emission is ON). Further, relating to each light emitting section, when the 11$^{th}$ bit, which is the highest rank bit, and the 10$^{th}$ bit, which is the second highest rank bit, are "0" (light emission is OFF) in all of the light emitting sections adjoining the concerned light emitting section and the next adjoining sections, only the concerned light emitting section simultaneously emits the light in all of bits from the 9$^{th}$ bit to the lowest rank bit. Therefore, influence of shift of an amount of light emission caused when adjoining pixels simultaneously emit light, can be effectively prevented.

Figure 10:
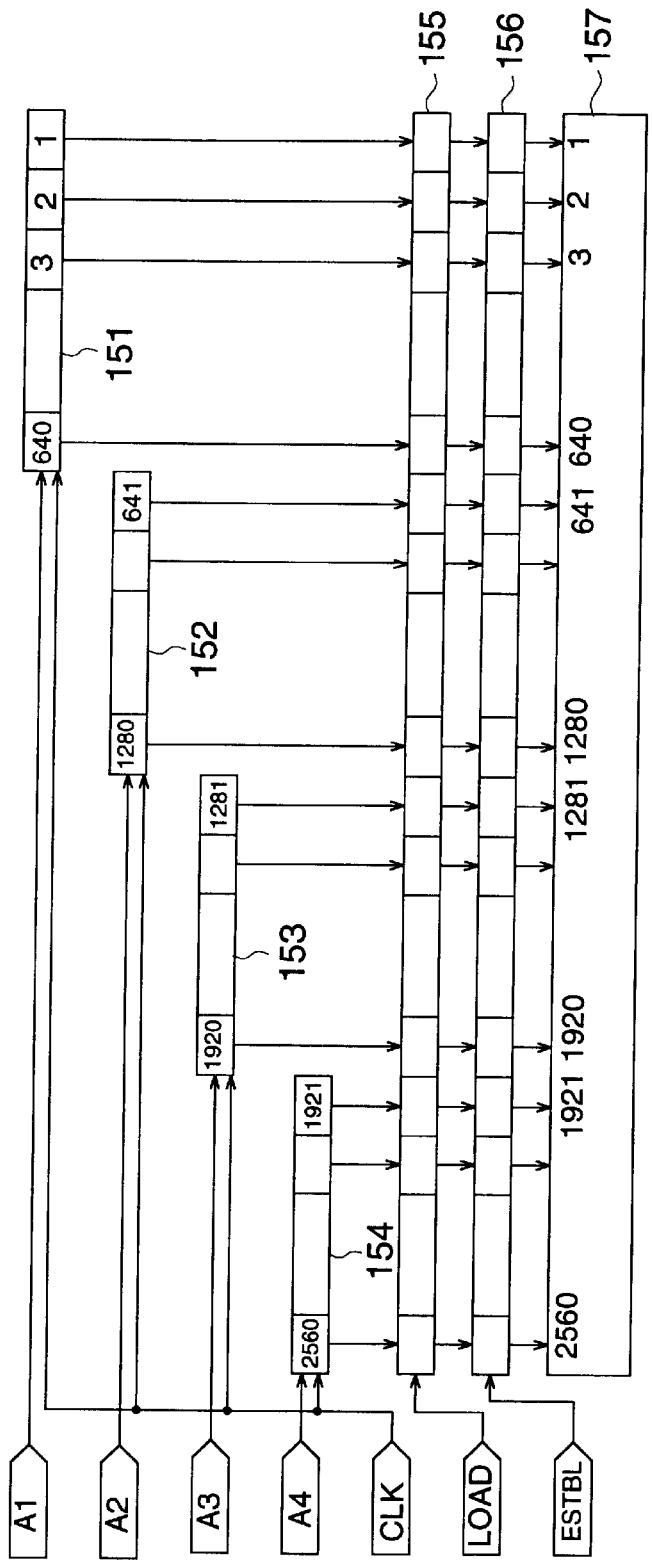
FIG. 10 is a circuit diagram of a recording head for red light of Example 1.

Next, a circuit inside the red light-use recording head 41 will be explained according to FIG. 10 which is a circuit diagram of the circuit inside the recording head 41. Inside the recording head 41, shift registers 151–154, a latch circuit 155, a gate 156, and a recording head 157. The signal receiving section of the recording head 41 receives the 1 bit serial image data A1, A2, A3, A4, latch control signal LOAD, output control signal ESTB, and clock signal CLK for data shift from a red light-use signal processing circuit of the signal processing section 10, and supplies these signals to each section as shown in FIG. 10.

Then, the shift register 151 sets 1 bit serial image data A1, the shift register 152 sets 1 bit serial image data A2, the shift register 153 sets 1 bit serial image data A3, the shift register 154 sets 1 bit serial image data A4, in timed relationship with the clock CLK for data shift.

The latch circuit 155 latches the 1 bit serial image data A1–A4 which are set in the shift registers 151–154 according to the latch control signal LOAD. The gate 156 generates 1 bit driving signal of L or H from the output control signal ESTB according to the 1 bit serial image signal latched by the latch circuit 155, and sends it to the recording head 157. The recording head 157 drives each light emitting section by the driving signal generated by the gate 156.

In this connection, the output control signal ESTB is a signal of H or L. The gate 156 is driven by the 1 bit serial image data when the output control signal ESTB is H, and the driving signal of all L is generated when the output control signal ESTB is L.

Figure 11:
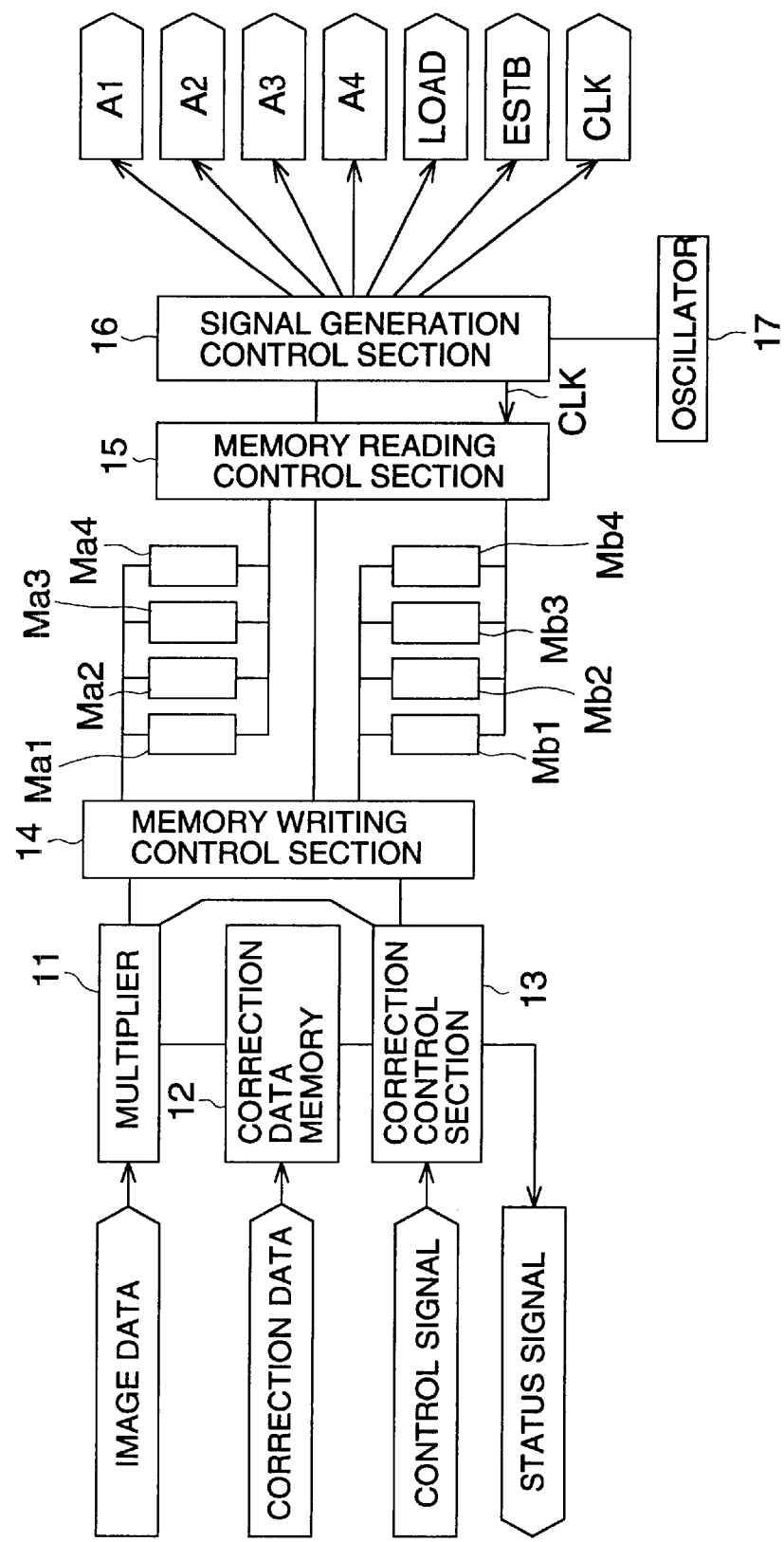
FIG. 11 is an outline block diagram of a signal processing circuit for red light of Example 1.

Next, the red light-use signal processing circuit of the signal processing section which generates the 1 bit serial image data A1, A2, A3, A4, latch control signal LOAD, output control signal ESTB, and clock signal CLK for data shift which are sent to the red light-use recording head 41, from the inputted image data, will be explained according to FIG. 11 which is an outline block diagram of the red light-use signal processing circuit of the signal processing section 10.

The signal processing circuit has a multiplier 11 which multiplies correction data by image data sent from the image processing control circuit 1 so that the unevenness of light emission characteristics of each light emitting section of the recording head is corrected; a correction data memory 12 which stores the correction data sent from the image processing control circuit 1, and supplies it to the multiplier 11; a correction control section 13 which receives the control signal from the image processing control circuit 1 and the status signal of a memory writing control section 14, controls the multiplier 11 and the correction data memory 12 corresponding to the control signal and the status signal, and sends the status signal to the image processing control circuit; a memory writing control section 14 which allots the image data corrected by the multiplier 11 to memories corresponding to each shift register of the recording head, and writes the data; a memory group (Ma1, Ma2, Ma3, Ma4, Mb1, Mb2, Mb3, Mb4) which is provided corresponding to shift registers 151–154 of the recording head; a memory reading control section 15 to read 1 bit serial image data for each bit from each memory according to the clock signal CLK for data shift sent from the signal generating control section 16; an oscillator 17 to oscillates a pulse having a predetermined frequency (for example, 20 MHz, that is, a period is 0.05 μsec); and a signal generation control section 16 which, according to the oscillation pulse from the oscillator 17, generates the latch control signal LOAD and sends it to the latch circuit 155, generates the output control signal ESTB and sends it to the gate 156, generates the clock signal CLK for data shift and sends it registers 152–154, and sends the 1 bit serial image data A1, A2, A3, A4 corresponding to shift registers 151–154, which are read by the memory reading control section 15, to respectively corresponding shift registers 151–154.

Then, the image data sent from the image processing control circuit 1 is multiplied by the correction data in the multiplier 11 and corrected. The corrected image data is allotted by the memory writing control section 14 to the memory corresponding to each shift register of the recording head and written.

The memory writing control section 14, memory group, and memory reading control section 15 are used for generating 1 bit serial image data for each bit stage as follows: the memory reading control section 15 controls the address of the memory group from which data is read, thereby, 12 bit multi-contrast image data is read for each bit stage in the order of the 0$^{th}$ bit, the 2$^{nd}$ bit, the 4$^{th}$ bit, the 6$^{th}$ bit, the 8$^{th}$ bit, the 10$^{th}$ bit, the 11$^{th}$ bit, the 9$^{th}$ bit, the 7$^{th}$ bit, the 5$^{th}$ bit, the 3$^{rd}$ bit and the 1$^{st}$ bit, and the 1 bit serial image data for each bit stage is generated. The 12 bit multi-contrast image data is the image data in which gradation is expressed by 12 bits from the 11$^{th}$ bit to the 0$^{th}$ bit in the binary system. The 11$^{th}$ bit which is the highest rank bit, is the largest digit, and the 0$^{th}$ bit which is the lowest rank bit, is the smallest digit. To read the 12 bit multi-contrast image data for each bit stage, means to read a value of 1/0 of each digit of the 12 bit multi-contrast image data in the binary system by 1 digit at a time.

The memory group has memories for each of shift registers 151–154, and therefore, by controlling the address of the memory from which data is read, by the memory reading control section 15, 12 bit multi-contrast image data stored in each memory is read for each bit stage in the order of the 0$^{th}$ bit, the 2$^{nd}$ bit, the 4$^{th}$ bit, the 6$^{th}$ bit, the 8$^{th}$ bit, the 10$^{th}$ bit, the 11$^{th}$ bit, the 9$^{th}$ bit, the 7$^{th}$ bit, the 5$^{th}$ bit, the 3$^{rd}$ bit, and the 1$^{st}$ bit, and the 1 bit serial image data A1, A2, A3, A4 for each bit stage are generated.

The memory group is divided into 2 systems of the memory system a composed of Ma1, Ma2, Ma3, Ma4 and the memory system b composed of Mb1, Mb2, Mb3, Mb4. The status in which, simultaneously when the memory writing control section 14 writes data in the memory system a, the memory reading control section 15 reads data from the memory system b, and the status in which, simultaneously when the memory writing control section 14 writes data in the memory system b, the memory reading control section 15 reads data from the memory system a, are alternately repeated. For this operation, the writing end signal showing that data writing into the memory has been completed, is sent from the memory writing control section 14 to the memory reading control section 15, and the memory reading control section 15 starts reading of the another memory system after reception of the writing end signal. Further, the reading end signal showing that data reading from the memory has been completed, is sent from the memory reading control section 15 to the memory writing control section 14, and the memory writing control section 14 starts writing into another memory system after reception of the reading end signal. According to this operation, timing of image data writing of the memory writing control section 14 and timing of image data reading of the memory reading control section 15 can be independent of each other.

Then, the memory writing control section 14 generates the status signal showing the status that writing into the memory has been completed and the reading end signal from the memory reading control section 15 is received, that is, the status signal showing whether the next image data can be written or not, and sends the signal to the correction control section 13. Then, the correction control section 13 generates the status signal showing that the memory writing control section 14 can write the next image data, and the multiplier 11 and the correction data memory 12 are on good condition, that is, the status signal showing whether the next image data can be received or not, and sends the signal to the image processing control circuit 1.

Figure 12:
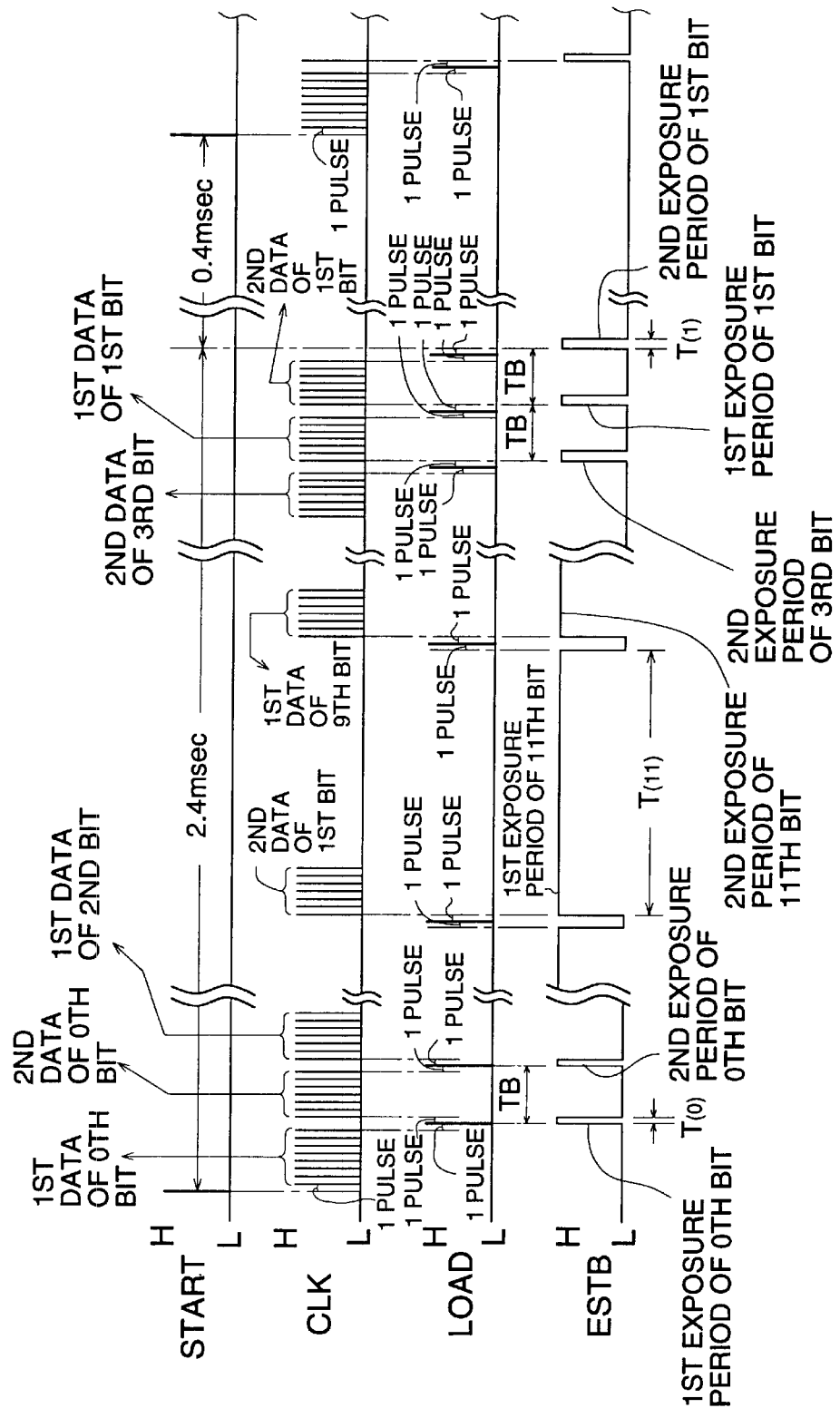
FIG. 12 is a timing chart showing a portion of a signal generation timing chart of each signal of a signal generation control section 16 of a signal control circuit for read light of Example 1.
Figure 13:
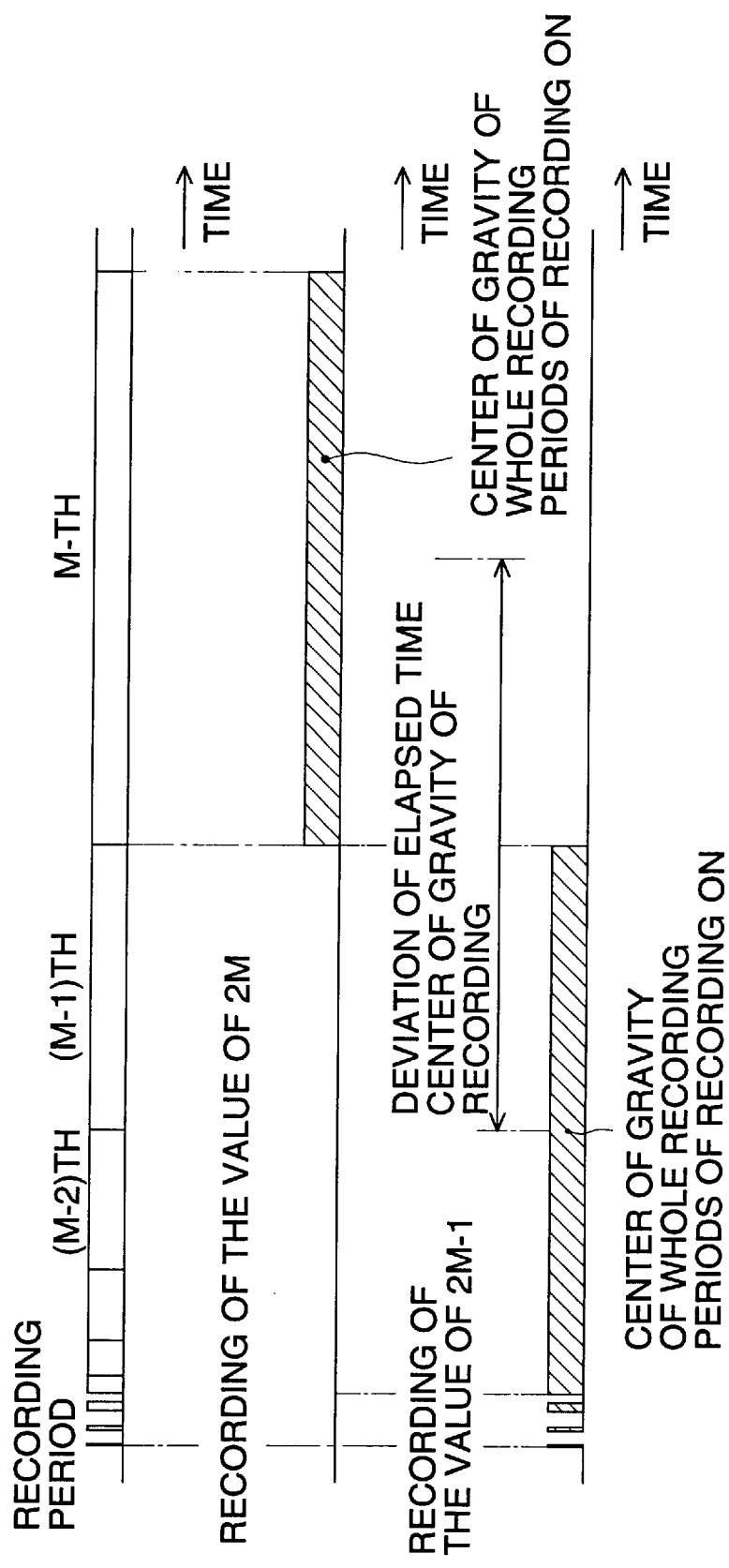
FIG. 13 is a view showing exposure timing in the exposure of a value of $2^M-1$ and the exposure of a value of $2^M$ in the controversial technology of the problem to be solved by the present invention.
Figure 14:
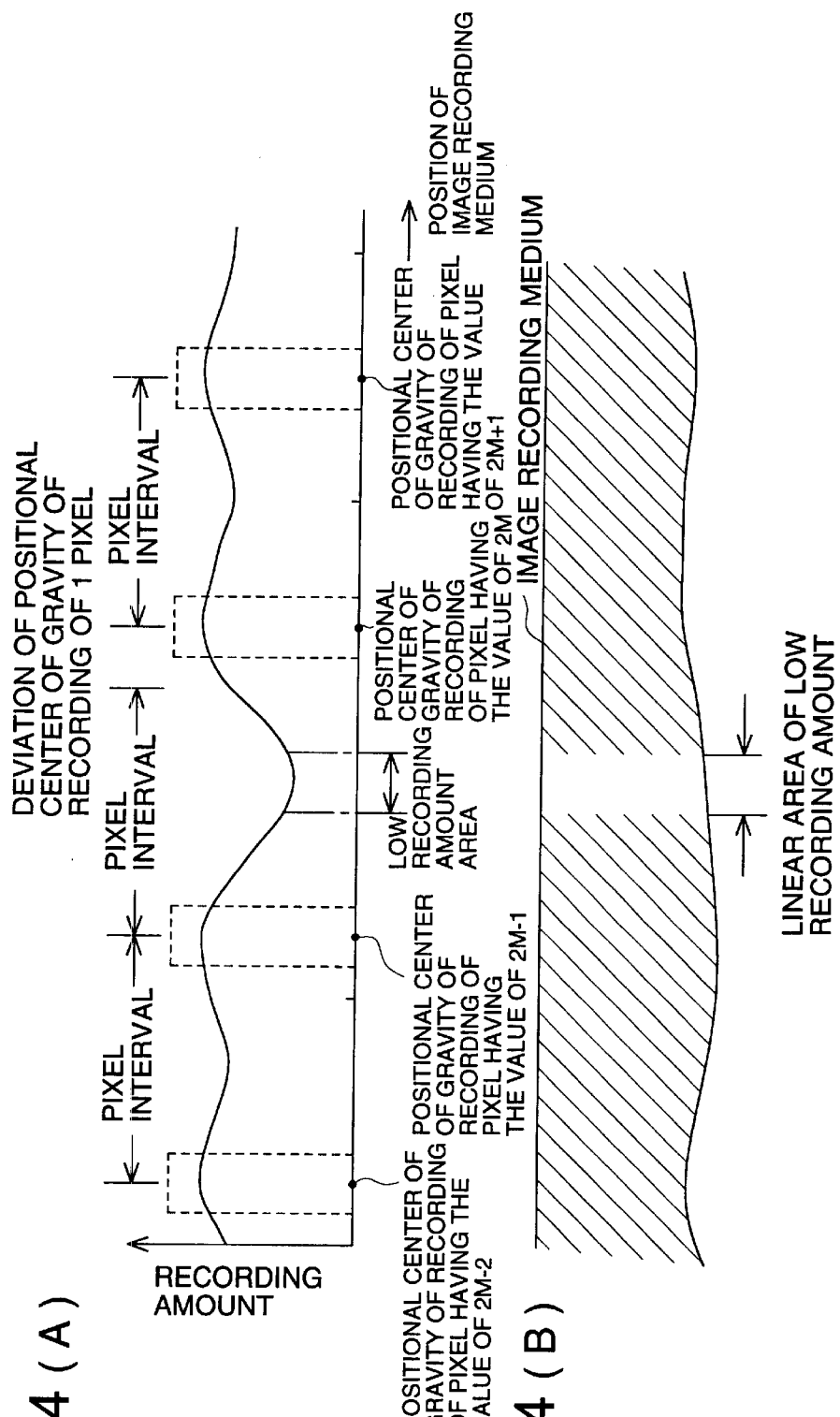
FIG. 14(A) is a view showing an exposure control amount and an exposure amount applied onto photosensitive material in the vicinity of the exposure of a value of $2^M-1$ and the exposure of a value of $2^M$ in the exposure of a gradation image of the controversial technology in the problem to be solved by the present invention.
FIG. 14(B) is a view showing the developing processed photosensitive material.
Figure 15:
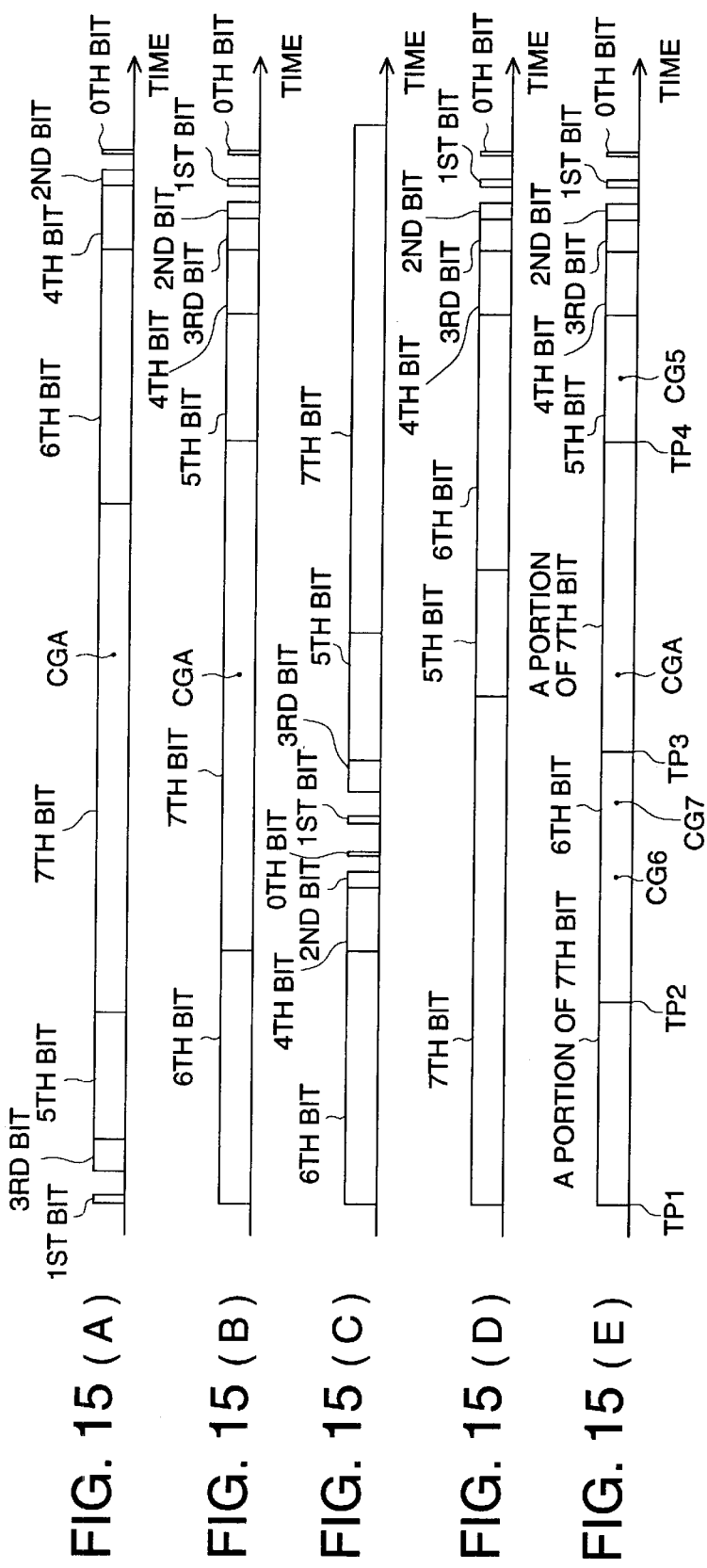
FIGS. 15(A) to 15(E) are views showing an example in which each light emitting control time T(m) (m is an integer not less than 0 and not more than N-1) of the m-th exposure timing of the plural times (N times) of exposure timing is not increased or decreased monotonously, and at least one of the light emitting control time T(m) is different from the other.
Figures 16A, 16B:
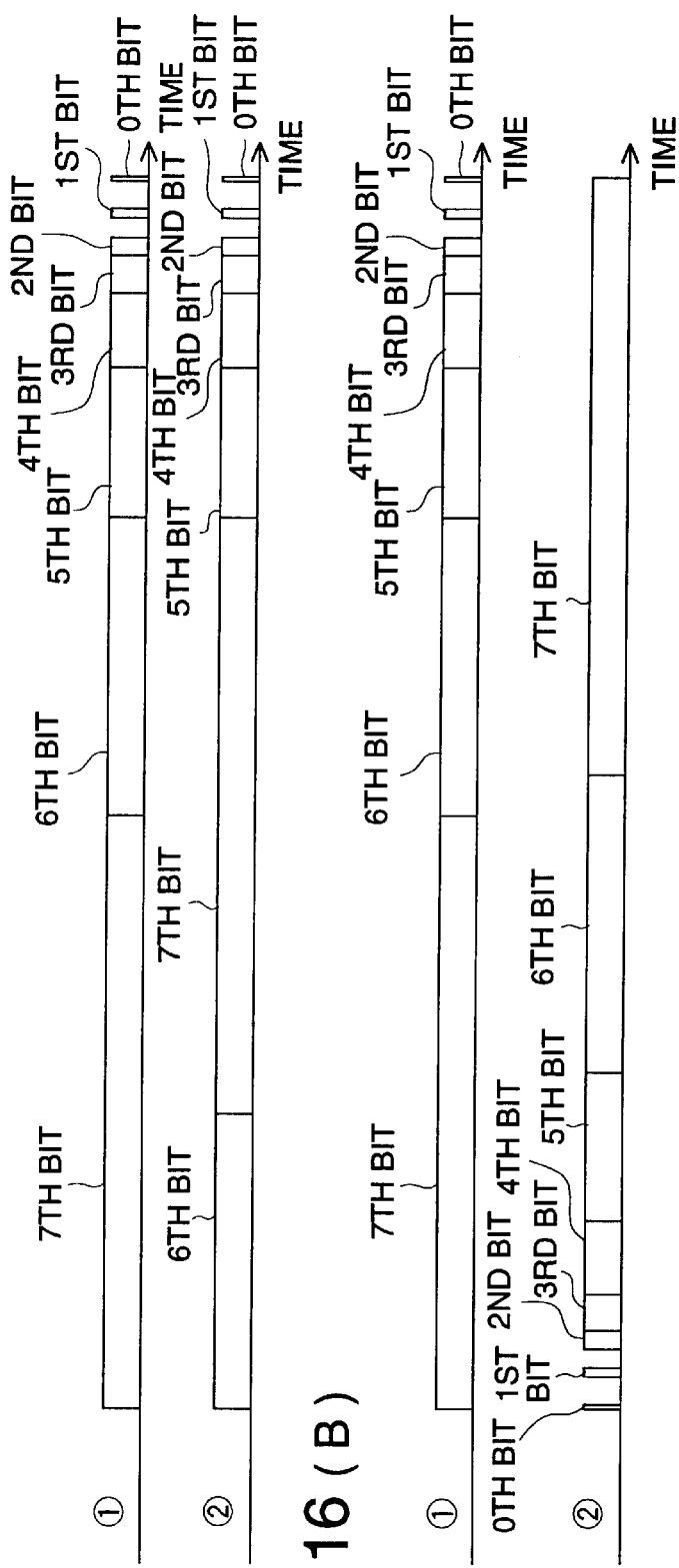
FIGS. 16(A) and 16(B) are views showing an example in which at least one light emitting section of the adjoining plural (not more than a predetermined number) light emitting sections does not have the same order as the other light emitting sections, in each light emitting control time T(m) (m is an integer not less than 0 and not more than N-1) of plural times (N times) of exposure timing.

The signal generation control section 16 generates each signal as shown in FIG. 12 which is a timing chart showing a portion of generation timing of each signal of the signal generation control section 16 of the red light-use signal control circuit.

When the START signal which is generated every time when a predetermined amount of the printing paper 2 is conveyed, is inputted into the signal generation control section 16, initially, the CLK signal generates pulses whose number is equal to the number of pixels of the light emitting section used for effective image recording, according to the oscillation pulse of the oscillator 17, and the $1^{st}$ serial image data of the $0^{th}$ bit is sent to shift registers 151–154. When the CLk signal has completed generation of pulses whose number is equal to the number of pixels of the light emitting section used for effective image recording, the CLk signal becomes the status of L, the pulses of the oscillator 17 is counted by 1, and the sequence advances to the next step.

Next, the following 1 unit of signal generating operation is repeated twice corresponding to each bit for each bit stage in the order of the $0^{th}$ bit, the $2^{nd}$ bit, the $4^{th}$ bit, the $6^{th}$ bit, the $8^{th}$ bit, the $10^{th}$ bit, the $11^{th}$ bit, the $9^{th}$ bit, the $5^{th}$ bit, the $3^{rd}$ bit, the $1^{st}$ bit. That is, the latch control signal LOAD is caused to generate 1 H pulse, and is made to be the status of L. Then, the signal generation control section 16 counts the pulse of the oscillator 17 by 1 pulse, makes the output control signal ESTB in the status of H, makes the CLk signal generate pulses whose number is equal to the number of pixels of the light emitting section used for effective image recording, and starts to send the 1 bit serial image data corresponding to the concerned bit to shift registers 151–154. Then, when the exposure period corresponding to the concerned bit has passed after the output control signal ESTB was made in the status of H, the output control signal ESTB is made in the status of L. When the CLk signal has completed the generation of pulses whose number is equal to the number of pixels of the light emitting section used for effective image recording, the CLK signal becomes the status of L. When the pulse of the oscillator 17 is counted by 1 after the longer period of time between a predetermined interval time TB and the exposure period corresponding to the concerned bit has passed from the time when the latch control signal LOAD has generated 1 H pulse and the pulse of the oscillator 17 is counted by 1, the latch control signal LOAD is caused to generate 1 H pulse. The above-described operation is 1 unit of the signal generating operation.

In this connection, the detection of the exposure period corresponding to the concerned bit in the 1 unit of signal generating operation which is conducted each twice corresponding to each bit for each bit stage, and the detection of the longer period of time between the exposure period corresponding to the concerned bit and the predetermined interval time TB, are conducted by counting the oscillation pulses of the oscillator 17 whose number is corresponding to the length TS(n) of the exposure period corresponding to each bit stage and the predetermined interval time TB, according to the length TS(n) of the exposure time allotted to each bit from the $11^{th}$ bit to the $0^{th}$ bit which is recorded in the signal generation control section 16, and the predetermined interval time TB.

Then, when the $2^{nd}$ time output control signal ESTB of the $1^{st}$ bit is made in the status of L, 1 line image recording of the effective image recording has been completed.

Next, the length TS(n)($\mu$sec) of each exposure period will be shown.

The length ($\mu$sec) of the exposure period of the $11^{th}$ bit:

$$TS(11)=2048\times\alpha$$

The length ($\mu$sec) of the exposure period of the $10^{th}$ bit:

$$TS(10)=1024\times\alpha$$

The length ($\mu$sec) of the exposure period of the $9^{th}$ bit:

$$TS(9)=514\times\alpha$$

The length ($\mu$sec) of the exposure period of the $8^{th}$ bit:

$$TS(8)=258\times\alpha$$

The length ($\mu$sec) of the exposure period of the $7^{th}$ bit:

$$TS(7)=130\times\alpha$$

The length ($\mu$sec) of the exposure period of the $6^{th}$ bit:

$$TS(6)=66\times\alpha$$

The length ($\mu$sec) of the exposure period of the $5^{th}$ bit:

$$TS(5)=34\times\alpha$$

The length (1 sec) of the exposure period of the $4^{th}$ bit:

$$TS(4)=18\times\alpha$$

The length ($\mu$sec) of the exposure period of the $3^{rd}$ bit:

$$TS(3)=10\times\alpha$$

The length ($\mu$sec) of the exposure period of the $2^{nd}$ bit:

$$TS(2)=6\times\alpha$$

The length ($\mu$sec) of the exposure period of the $1^{st}$ bit:

$$TS(1)=4\times\alpha$$

The length ($\mu$sec) of the exposure period of the $0^{th}$ bit:

$$TS(0)=3\times\alpha$$

In this connection, $\alpha$ is a factor determined by the recording head (LED array), the resolution in the subsidiary scanning direction in image recording, the speed of relative movement of the recording head and photosensitive material, or the like, and in the present example, a factor of 0.01–0.5.

When this is expressed by $$TS(n) = \alpha \times 2^{nd} + \beta(n),$$

$$\beta(11) = \beta(10) = 0$$

$$\beta(9) = \beta(8) = \beta(7) = \beta(6) = \beta(5) = \beta(4) = \beta(3) = \beta(2) = \beta(1) = \beta(0) 2 \times \alpha$$

If, by the way, the image quality obtained by the time length determined in accordance with the coefficients α and β is still required to be improved, the coefficient γ(n) can be used.

The interval time TB is a period of time to send 1 bit serial image data to the shift registers 151–154 during a period of time between the latch control signal LOAD pulse and the next pulse, that is, a period of time to send 1 bit serial image data to the shift registers 151–154 is added by the margin time (for example, 0.1 μsec).

Next, the contents of 1 bit serial image data A1, A2, A3, A4 which are sent to shift registers 151–154 twice for each bit stage from the $11^{th}$ bit to the $0^{th}$ bit, in the order of the $0^{th}$ bit, the $2^{nd}$ bit, the $4^{th}$ bit, the $6^{th}$ bit, the $8^{th}$ bit, the $10^{th}$ bit, the $11^{th}$ bit, the $9^{th}$ bit, the $7^{th}$ bit, the $5^{th}$ bit, the $3^{rd}$ bit, the $1^{st}$ bit will be explained. Initially, the 1 bit serial image data A1, a2, A3, A4 at the first timing, is generated as follows: data of a number (1, 3, 5, . . . 2557, 2559) in which, when a number of the light emitting section is divided by 2, the surplus is 1, is read from the memory, and all data of the other number (2, 4, 6, . . . 2558, 2560) is set to "0" (light emission is OFF). The 1 bit serial image data A1, A2, A3, A4 at the next timing, is generated as follows: data of a number (2, 4, 6, . . . 2558, 2560) in which, when a number of the light emitting section is divided by 2, the surplus is 0, is read from the memory, and all data of the other number (1, 3, 5, . . . 2557, 2559) is set to "0" (light emission is OFF).

Thereby, because adjoining light emitting sections do not emit light, the influence of variation of the exposure amount depending on whether the adjoining light emitting sections conduct exposure or not, can be effectively prevented.

EXAMPLE 2

The present example is a modified example of Example 1. All of differences between the present example and Example 1 will be explained below.

The contents of 1 bit serial image data AR1, AR2, AR3, AR4, AL1, AL2, AL3, and AL4, which are sent to shift registers 111–118 4 times for each bit stage from the $9^{th}$ bit to the $0^{th}$ bit, are different from Example 1 as follows. These will be explained according to FIG. 18 which is a portion of a serial image data transmission timing chart of the signal control circuit for blue light and green light.

Initially, the 1 bit serial image data AL1 and AR1 are generated using the timing (1)–(4) shown in the uppermost column in FIG. 18 as the reference as follows.

When the serial image data of the $11^{th}$ bit of each pixel stored in memories MaL1, MaR1 or memories MbL1, and MbR1 is "0" (light emission is OFF) and the serial image data of the $10^{th}$ bit is "0" (light emission is OFF), (that is, data of the concerned pixel is not less than 0 and not more than 1023), the data of the concerned bit stage stored in the memory at each bit stage from the $9^{th}$ bit to the $0^{th}$ bit is read at the timing(1), and data is set to "0" at other timing (2)–(4), thereby, data of the concerned pixel is produced.

When the serial image data of the $11^{th}$ bit of each pixel stored in memories MaL1, MaR1 or memories MbL1, and MbR1 is "0" (light emission is OFF) and the serial image data of the $10^{th}$ bit is "1" (light emission is ON), (that is, data of the concerned pixel is not less than 1024 and not more than 2047), data is set to "1" at timing (1), and the data of the concerned bit stage stored in the memory at each bit stage from the $9^{th}$ bit to the $0^{th}$ bit is read at the timing(2), and data is set to "0" at other timing (3) and (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "0" (light emission is OFF), (that is, data of the concerned pixel is not less than 2047 and not more than 3071), data is set to "1" at timing (1) and (2), and the data of the concerned bit stage stored in the memory at each bit stage from the $9^{th}$ bit to the $0^{th}$ bit is read at the timing(3), and data is set to "0" at other timing (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "1" (light emission is ON), (that is, data of the concerned pixel is not less than 3072 and not more than 4095), data is set to "1" at timing (1)–(3), and the data of the concerned bit stage stored in the memory at each bit stage from the $9^{th}$ bit to the $0^{th}$ bit is read at the timing(4), thereby, data of the concerned pixel is produced.

Figure 18:
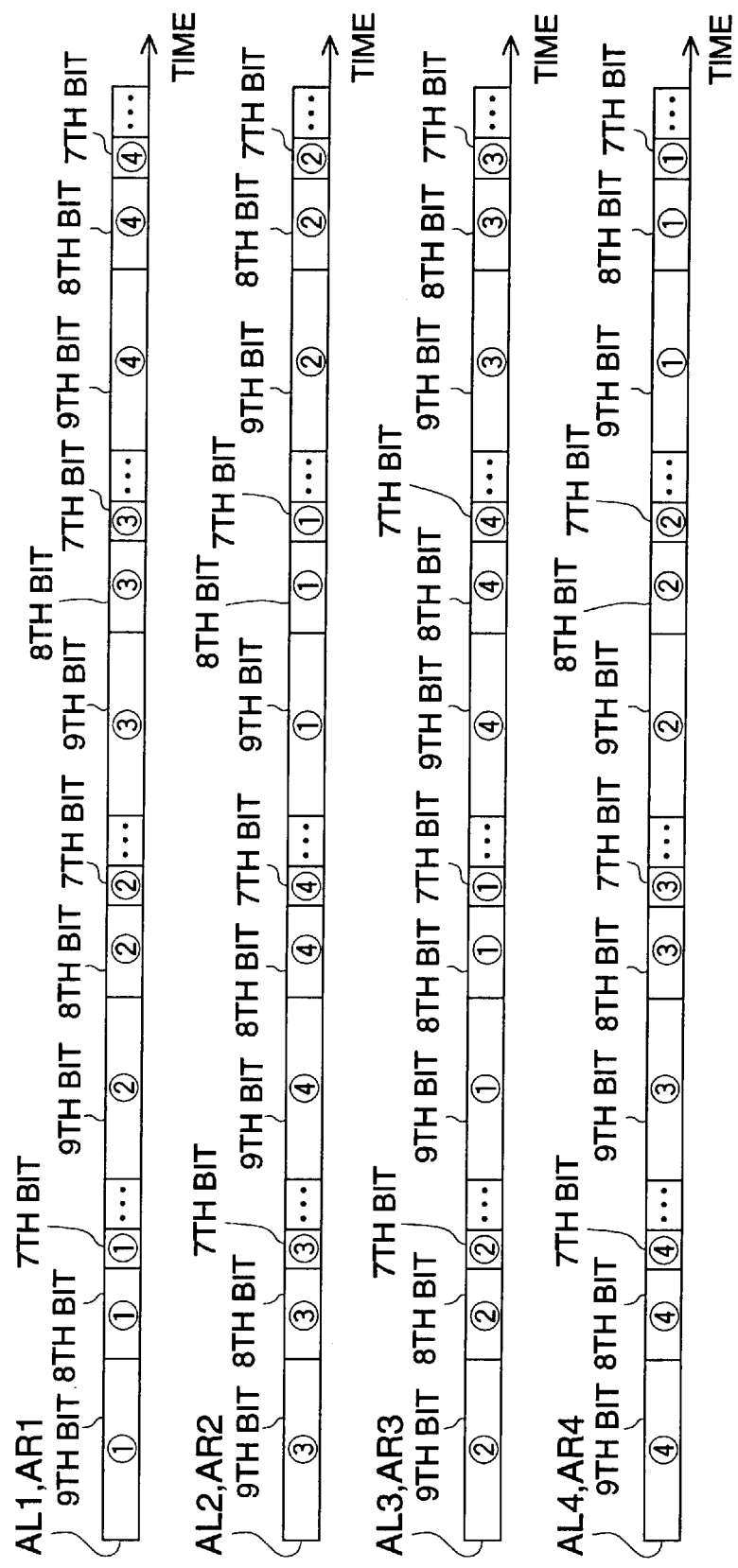
FIG. 18 is a serial image data transmission timing chart for blue light and green light of Example 2.

Further, the 1 bit serial image data AL2 and AR2 are generated using timing (1)–(4) shown in the second uppermost column in FIG. 18 as the reference, from data of each pixel stored in memories MaL2, MaR2 or MbL2, MbR2 in the same manner as the above-description. The 1 bit serial image data AL3 and AR3 are generated using timing (1)–(4) shown in the third uppermost column in FIG. 18 as the reference, from data of each pixel stored in memories MaL3, MaR3 or MbL3, MbR3 in the same manner as the above-description. The 1 bit serial image data AL4 and AR4 are generated using timing (1)–(4) shown in the fourth uppermost column in FIG. 18 as the reference, from data of each pixel stored in memories MaL4, MaR4 or memories MbL4, MbR4 in the same manner as the above-description.

In order to control as described above, in each blue light and green light-use signal generating circuit, the signal generation control section 16 repeats it 4 times to conduct the signal generating operation in the order from the $9^{th}$ bit to the $0^{th}$ bit by 1 unit.

In the present example, the content of 1 bit serial image data A1, a2, A3, A4 sent to shift registers 151–154 twice for each bit stage from the $11^{th}$ bit to the $0^{th}$ bit of the red light-use signal control circuit, is different from that of Example 1 as follows.

The content of 1 bit serial image data A1, a2, A3, A4 sent to shift registers 151–154 in the order from the $11^{th}$ bit to the $0^{th}$ bit, twice for each bit stage from the $11^{th}$ bit to the $0^{th}$ bit of the red light-use signal control circuit, will be described below. Initially, A1, a2, A3 and A4 are generated as follows: 1 bit serial image data from the $11^{th}$ bit to the $0^{th}$ bit of a number (1, 3, 5, . . . 2557, 2559) in which, when a number of the light emitting section is divided by 2, the surplus is 1, is read from the memory, and all data of the other number (2, 4, 6, . . . 2558, 2560) is set to "0" (light emission is OFF). Next, A1, A2, A3, and A4 are generated as follows: 1 bit serial image data from the $11^{th}$ bit to the $0^{th}$ bit of a number (2, 4, 6, . . . 2558, 2560) in which, when a number of the light emitting section is divided by 2, the surplus is 0, is read from the memory, and all data of the other number (1, 3, 5, . . . 2557, 2559) is set to "0" (light emission is OFF).

In order to control as described above, in the red light-use signal generating circuit, the signal generation control section 16 repeats it twice to conduct the signal generating operation in the order from the $11^{th}$ bit to the $0^{th}$ bit by 1 unit.

EXAMPLE 3

The present example is a modified example of Example 1. All of differences between the present example and Example 1 will be explained below.

The contents of 1 bit serial image data AR1, AR2, AR3, AR4, AL1, AL2, AL3, and AL4, which are sent to shift registers 111–118 4 times for each bit stage from the $9^{th}$ bit to the $0^{th}$ bit, are different from Example 1 as follows. These will be explained according to FIG. 19 which is a portion of a serial image data transmission timing chart of the signal control circuit for blue light and green light.

Initially, the 1 bit serial image data AL1 and ARI are generated using the timing (1)–(4) shown in the uppermost column in FIG. 19 as the reference as follows.

When the serial image data of the $11^{th}$ bit of each pixel stored in memories MaL1, MaR1 or memories MbL1, and MbR1 is "0" (light emission is OFF) and the serial image data of the $10^{th}$ bit is "0" (light emission is OFF), (that is, data of the concerned pixel is not less than 0 and not more than 1023), the data of the concerned bit stage stored in the memory at each bit stage from the $9^{th}$ bit to the $0^{th}$ bit is read at the timing(1), and data is set to "0" at other timing (2)–(4), thereby, data of the concerned pixel is produced.

When the serial image data of the $11^{th}$ bit of each pixel stored in memories MaL1, MaR1 or memories MbL1, and MbR1 is "0" (light emission is OFF) and the serial image data of the $10^{th}$ bit is "1" (light emission is ON), (that is, data of the concerned pixel is not less than 1024 and not more than 2047), data is set to "1" at timing (1), and the data of the concerned bit stage stored in the memory at each bit stage from the $9^h$ bit to the $0^{th}$ bit is read at the timing(2), and data is set to "0" at other timing (3) and (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "0" (light emission is OFF), (that is, data of the concerned pixel is not less than 2047 and not more than 3071), data is set to "1" at timing (1) and (2), and the data of the concerned bit stage stored in the memory at each bit stage from the $9^h$ bit to the $0^{th}$ bit is read at the timing(3), and data is set to "0" at timing (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "1" (light emission is ON), (that is, data of the concerned pixel is not less than 3072 and not more than 4095), data is set to "1" at timing (1)–(3), and the data of the concerned bit stage stored in the memory at each bit stage from the $9^{th}$ bit to the $0^{th}$ bit is read at the timing(4), thereby, data of the concerned pixel is produced.

Figure 19:
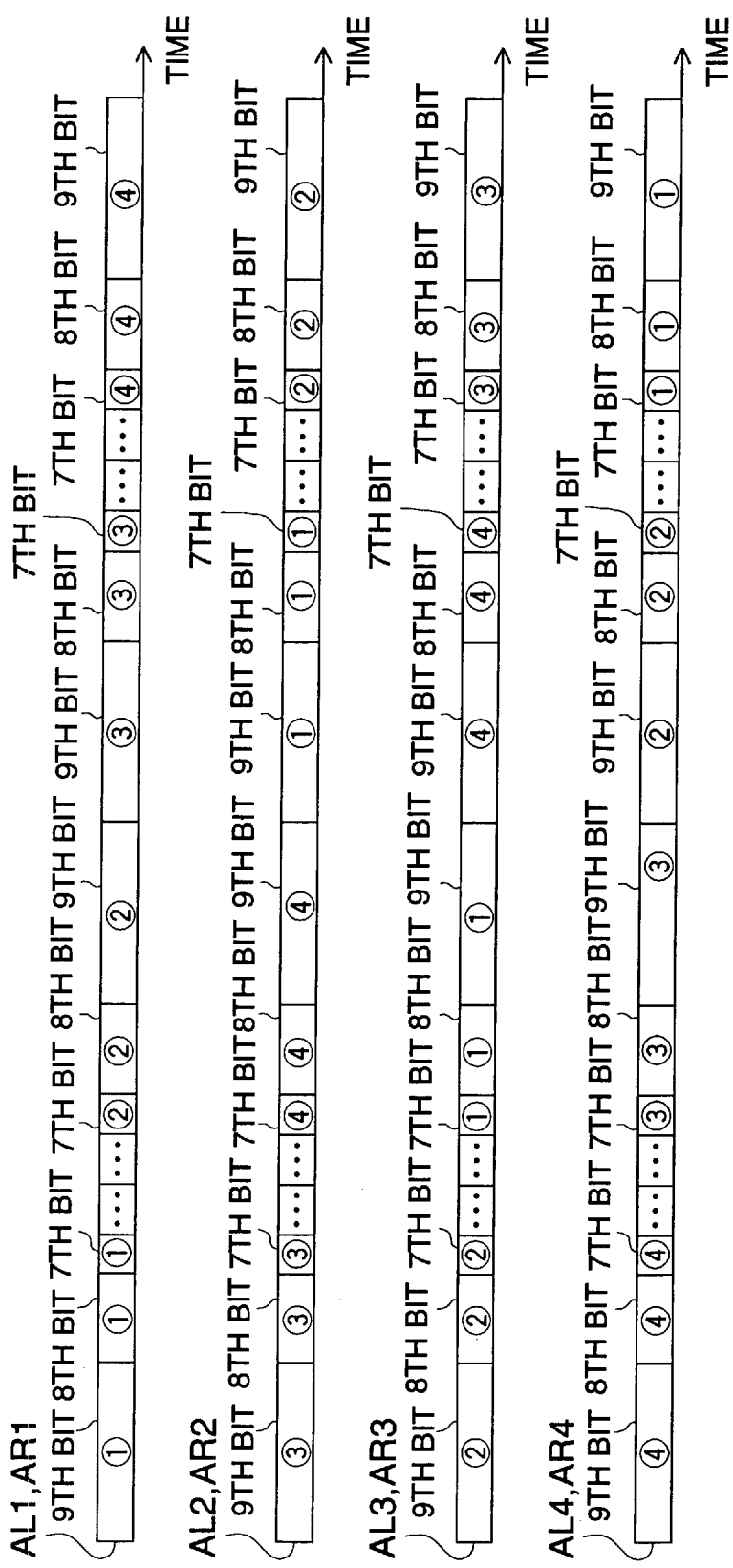
FIG. 19 is a serial image data transmission timing chart for blue light and green light of Example 3.

Further, the 1 bit serial image data AL2 and AR2 are generated using timing (1)–(4) shown in the second uppermost column in FIG. 19 as the reference, from data of each pixel stored in memories MaL2, MaR2 or memories MbL2, MbR2 in the same manner as the above-description. The 1 bit serial image data AL3 and AR3 are generated using timing (1)–(4) shown in the third uppermost column in FIG. 19 as the reference, from data of each pixel stored in memories MaL3, MaR3 or memories MbL3, MbR3 in the same manner as the above-description. The 1 bit serial image data AL4 and AR4 are generated using timing (1)–(4) shown in the fourth uppermost column in FIG. 19 as the reference, from data of each pixel stored in memories MaL4, MaR4 or memories MbL4, MbR4 in the same manner as the above-description.

In order to control as described above, in the blue light-use and green light-use signal generating circuits, the signal generation control section 16 conducts the signal generating operation in the order from the $9^{th}$ bit to the $0^{th}$ bit by 1 unit. Next, the signal generation control section 16 conducts the signal generating operation in the order from the $0^{th}$ bit to the $9^{th}$ bit by 1 unit, and then conducts the signal generating operation in the order from the $9^{th}$ bit to the $0^{th}$ bit by 1 unit. Next, the signal generation control section 16 conducts the signal generating operation in the order from the $0^{th}$ bit to the $9^{th}$ bit by 1 unit.

In the present example, the content of 1 bit serial image data A1, a2, A3, A4 sent to shift registers 151–154 twice for each bit stage from the $11^{th}$ bit to the $0^{th}$ bit of the red light-use signal control circuit, is different from that of Example 1 as follows.

The content of 1 bit serial image data A1, a2, A3, A4 sent to shift registers 151–154 in the order from the $11^{th}$ bit to the $0^{th}$ bit, and next, sent to shift registers 151–154 in the order from the $0^{th}$ bit to the $11^{th}$ bit, for each bit stage from the $11^{th}$ bit to the $0^{th}$ bit of the red light-use signal control circuit, will be described below. Initially, A1, a2, A3 and A4 are generated as follows: 1 bit serial image data from the $11^{th}$ bit to the $0^{th}$ bit of a number (1, 3, 5, . . . 2557, 2559) in which, when a number of the light emitting section is divided by 2, the surplus is 1, is read from the memory, and all data of the other number (2, 4, 6, . . . 2558, 2560) is set to "0" (light emission is OFF). Next, A1, A2, A3, and A4 are generated as follows: 1 bit serial image data from the $0^{th}$ bit to the $11^{th}$ bit of a number (2, 4, 6, . . . 2558, 2560) in which, when a number of the light emitting section is divided by 2, the surplus is 0, is read from the memory, and all data of the other number (1, 3, 5, . . . 2557, 2559) is set to "0" (light emission is OFF).

In order to control as described above, in the red light-use signal generating circuit, the signal generation control section 16 conducts the signal generating operation in the order from the $11^{th}$ bit to the $0^{th}$ bit by 1 unit, and next, conducts the signal generating operation in the order from the $0^{th}$ bit to the $11^{th}$ bit by 1 unit.

EXAMPLE 4

The present example is a modified example of Example 3. All of differences between the present example and Example 3 will be explained below.

In the present example, only the contents of 1 bit serial image data AR1, AR2, AR3, AR4, AL1, AL2, AL3, and AL4, which are sent to shift registers 111–118 4 times for each bit stage from the $9^{th}$ bit to the $0^{th}$ bit, are different from Example 3 as follows. These will be explained according to FIG. 20 which is a portion of a serial image data transmission timing chart of the signal control circuit for blue light and green light.

Initially, the 1 bit serial image data AL1 and AR1 are generated using the timing (1)–(4) shown in the uppermost column in FIG. 20 as the reference as follows.

When the serial image data of the $11^{th}$ bit of each pixel stored in memories MaL1, MaR1 or memories MbL1, and MbR1 is "0" (light emission is OFF) and the serial image data of the $10^{th}$ bit is "0" (light emission is OFF), (that is, data of the concerned pixel is not less than 0 and not more than 1023), the data of the concerned bit stage stored in the memory at each bit stage from the $9^{th}$ bit to the $0^{th}$ bit is read at the timing(1), and data is set to "0" at other timing (2)–(4), thereby, data of the concerned pixel is produced.

When the serial image data of the $11^{th}$ bit of each pixel stored in memories MaL1, MaR1 or memories MbL1, and MbR1 is "0" (light emission is OFF) and the serial image data of the $10^{th}$ bit is "1" (light emission is ON), (that is, data of the concerned pixel is not less than 1024 and not more than 2047), data is set to "1" at timing (1), and the data of the concerned bit stage stored in the memory at each bit stage from the $9^{th}$ bit to the $0^{th}$ bit is read at the timing(2), and data is set to "0" at other timing (3) and (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "0" (light emission is OFF), (that is, data of the concerned pixel is not less than 2047 and not more than 3071), data is set to "1" at timing (1) and (2), and the data of the concerned bit stage stored in the memory at each bit stage from the $9^{th}$ bit to the $0^{th}$ bit is read at the timing(3), and data is set to "0" at timing (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "1" (light emission is ON), (that is, data of the concerned pixel is not less than 3072 and not more than 4095), data is set to "1" at timing (1)–(3), and the data of the concerned bit stage stored in the memory at each bit stage from the $9^{th}$ bit to the $0^{th}$ bit is read at the timing(4), thereby, data of the concerned pixel is produced.

Figure 20:
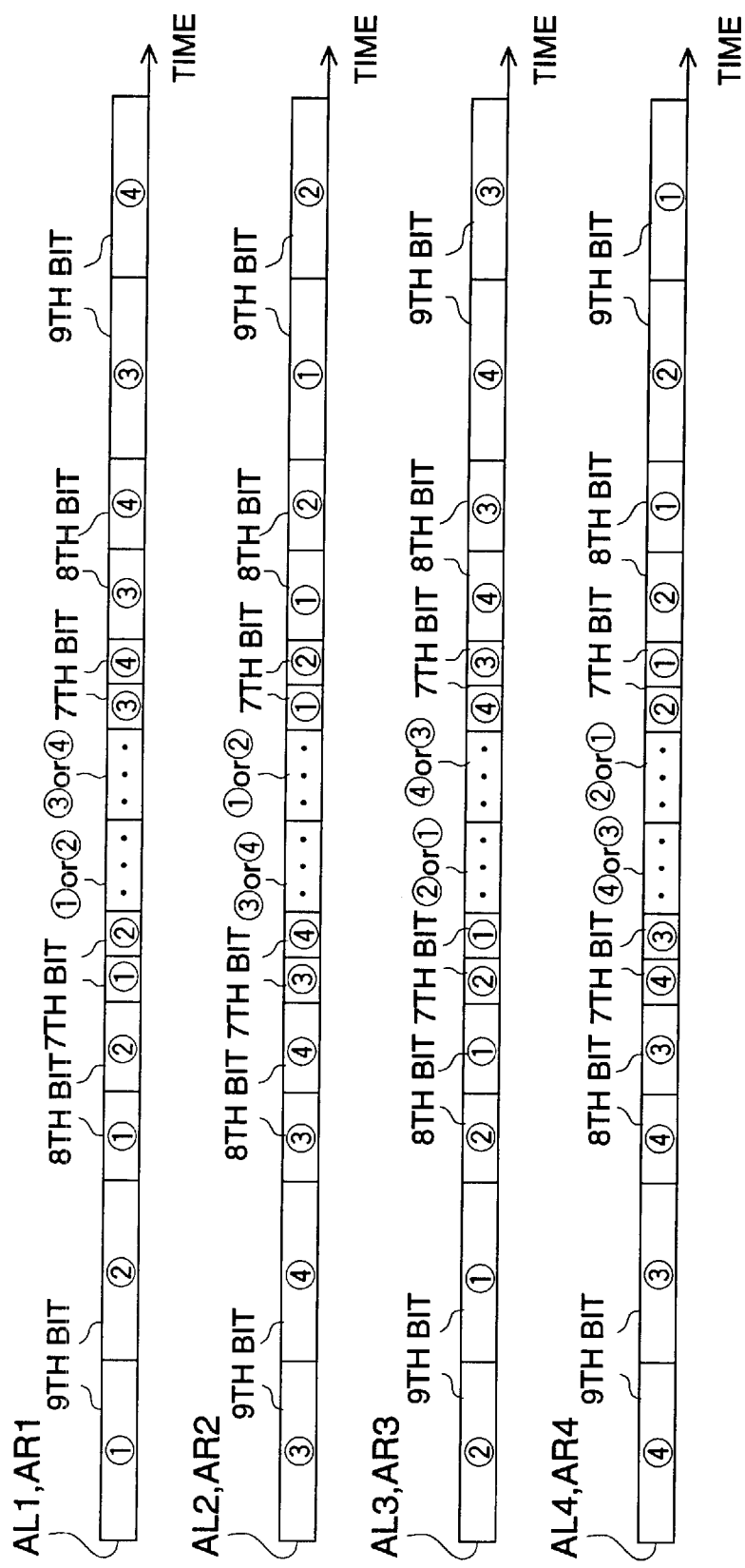
FIG. 20 is a serial image data transmission timing chart for blue light and green light of Example 4.

Further, the 1 bit serial image data AL2 and AR2 are generated using timing (1)–(4) shown in the second uppermost column in FIG. 20 as the reference, from data of each pixel stored in memories MaL2, MaR2 or memories MbL2, MbR2 in the same manner as the above-description. The 1 bit serial image data AL3 and AR3 are generated using timing (1)–(4) shown in the third uppermost column in FIG. 20 as the reference, from data of each pixel stored in memories MaL3, MaR3 or memories MbL3, MbR3 in the same manner as the above-description. The 1bit serial image data AL4 and AR4 are generated using timing (1)–(4) shown in the fourth uppermost column in FIG. 19 as the reference, from data of each pixel stored in memories MaL4, MaR4 or memories MbL4, MbR4 in the same manner as the above-description.

In order to control as described above, in the blue light-use and green light-use signal generating circuits, the signal generation control section 16 conducts the signal generating operation in the order from the $9^{th}$ bit to the $0^{th}$ bit by 2 units for each bit. Next, the signal generation control section 16 conducts the signal generating operation in the order from the $0^{th}$ bit to the $9^{th}$ bit by 2 units for each bit.

Figure 21:
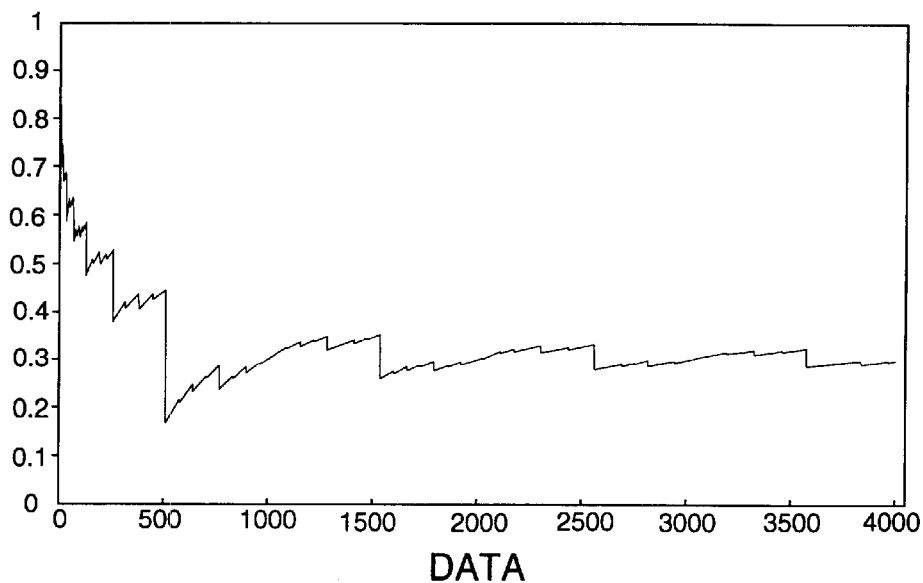
FIG. 21 is a view showing a result of a displacement amount of an exposure position of the controversial technology. (The axis of ordinates shows the displacement amount of the positional center of gravity of the exposure, and the axis of abscissas shows each value of a gradation image.)
Figure 22:
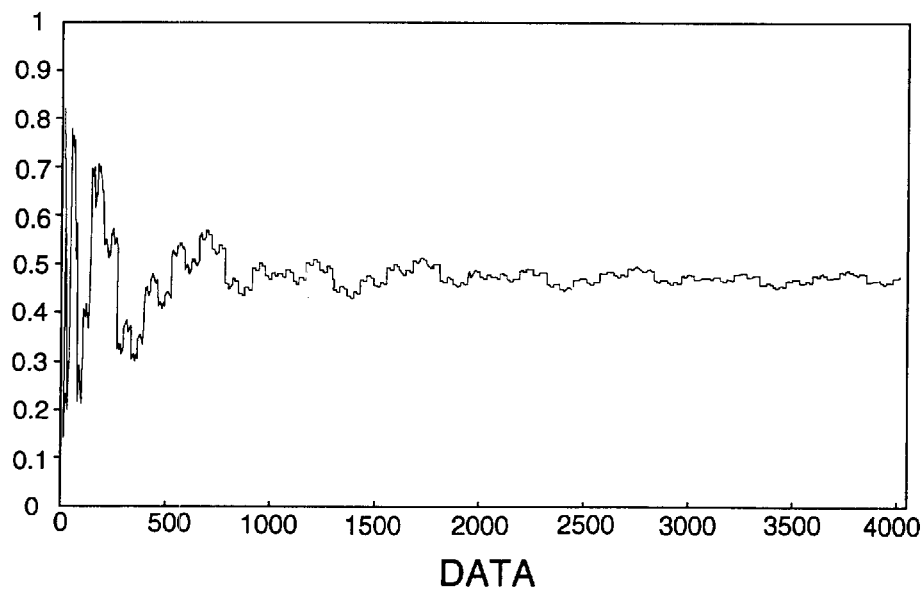
FIG. 22 is a view showing a result of a displacement amount of exposure position of Example 1. (The axis of ordinates shows the displacement amount of the positional center of gravity of the exposure, and the axis of abscissas shows each value of a gradation image.)
Figure 23:
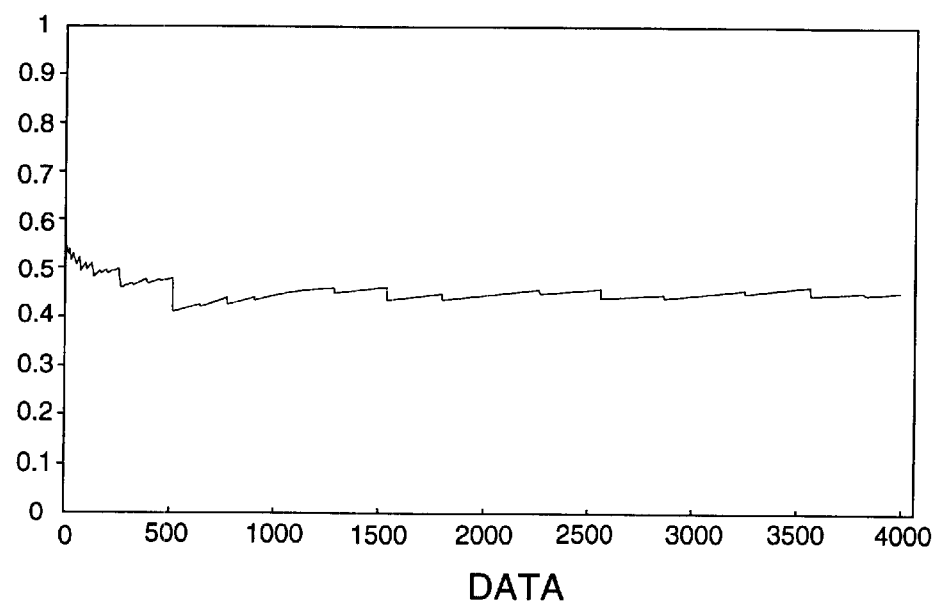
FIG. 23 is a view showing a result of a displacement amount of an exposure position of Example 2. (The axis of ordinates shows the displacement amount of the positional center of gravity of the exposure, and the axis of abscissas shows each value of a gradation image.)
Figure 24:
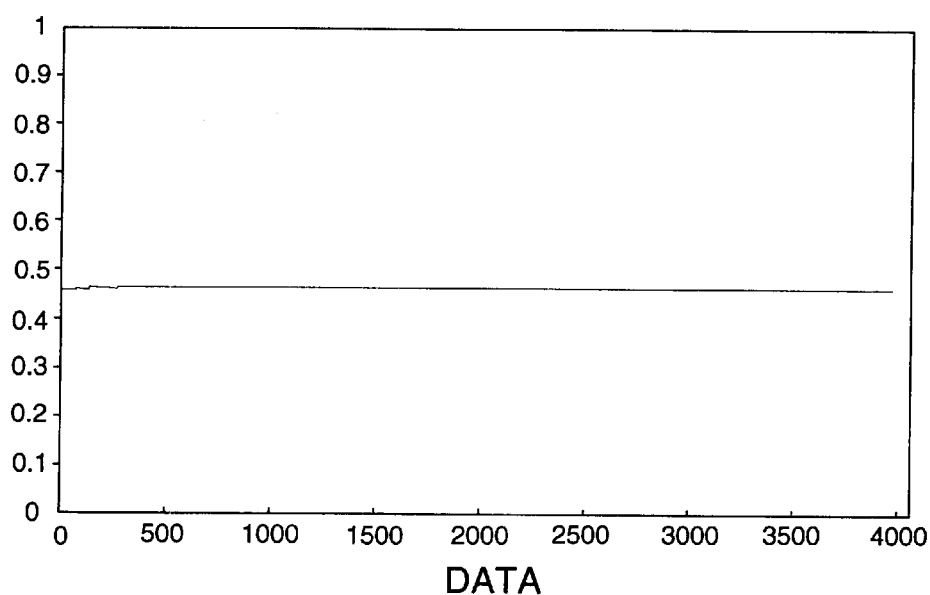
FIG. 24 is a view showing a result of a displacement amount of an exposure position of Example 3. (The axis of ordinates shows the displacement amount of the positional center of gravity of the exposure, and the axis of abscissas shows each value of a gradation image.)
Figure 25:
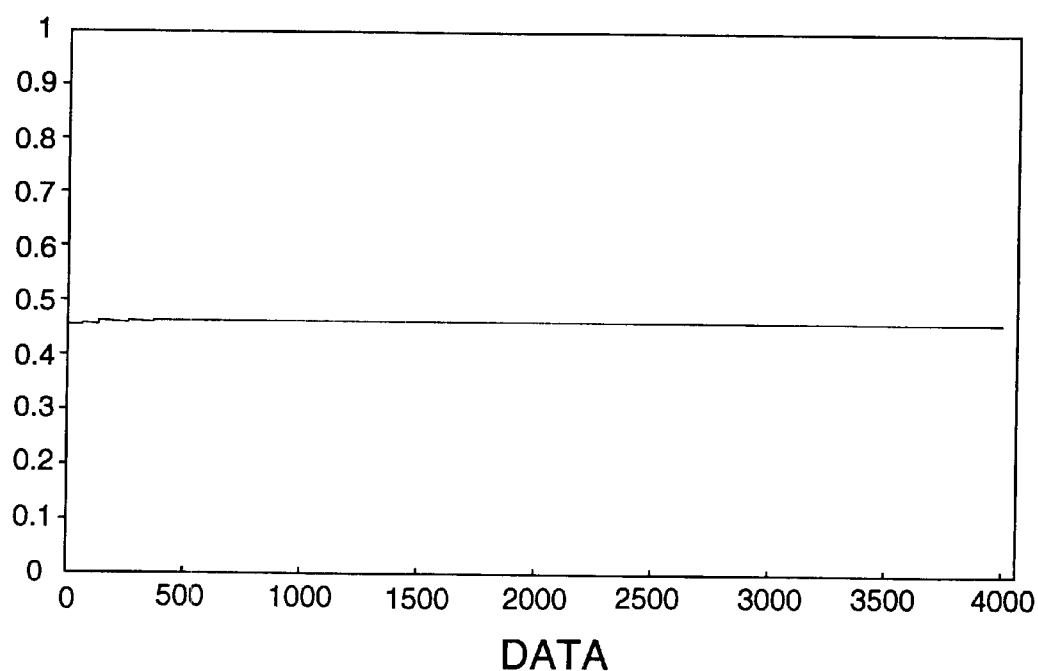
FIG. 25 is a view showing a result of a displacement amount of an exposure position of Example 4. (The axis of ordinates shows the displacement amount of the positional center of gravity of the exposure, and the axis of abscissas shows each value of a gradation image.)

An amount of displacement of the positional center of gravity of the exposure of adjoining 4 light emitting sections with respect to a position corresponding to the time at which the START signal is generated when an average of intervals between adjoining pixels in the relative movement direction is 1, when a gradation image is exposed on the photosensitive material by the blue light and green light-use recording head in the controversial technology shown in the column of the problem to be solved by the invention, and Example 1–4 shown in the column of the preferred embodiments of the invention, is investigated. These results are respectively shown in FIGS. 21–25. FIG. 21 shows the result of the controversial technology, FIG. 22 shows the result of Example 1, FIG. 23 shows the result of Example 2, FIG. 24 shows the result of Example 3, and FIG. 25 shows the result of Example 4. In FIGS. 21–25, the axis of ordinate shows an amount of displacement of the positional center of gravity of exposure, and the axis of abscissa shows each value of the gradation image.

In this connection, in Example 1 shown in FIG. 22, the shift between the positional center of gravity of exposure of a value of 255 and the positional center of gravity of exposure of a value of 256 is large, and there is a large shift of the positional center of gravity of exposure between adjoining numerical values not more than 256. However, in the value not more than 256, when the gradation image is exposed on the photosensitive material, a high density line or a low density line which do not exist originally in the gradation image, is not generated clearly and is not so conspicuous, so that it is not a serious problem.

However, in the controversial technology shown in FIG. 21, the shift between the positional center of gravity of exposure of a value of 511 and the positional center of gravity of exposure of a value of 512 is large, and there is a large shift of the positional center of gravity of exposure between adjoining numerical values not less than 256. When the gradation image is exposed on the photosensitive material, a high density line or a low density line which do not exist originally in the gradation image, is clear and conspicuous, so that it is a problem.

Further, in Example 2–4 shown in FIGS. 23–25, there is no large shift of the positional center of gravity of exposure between adjoining numerical values. When the gradation image is exposed on the photosensitive material, a high density line or a low density line which do not exist originally in the gradation image, is scarcely generated, so that it is not a problem. Specifically, in Example 3 and 4 shown in FIGS. 24 and 25, there is almost no shift of the positional center of gravity of exposure between adjoining numerical values. When the gradation image is exposed on the photosensitive material, a high density line or a low density line which do not exist originally in the gradation image, is not generated, so that it is not a problem.

The effect of the present invention is that the high density line or low density line which does not originally exist in the gradation image, can be prevented from becoming conspicuous when the gradation image is exposed on the photosensitive material.

What is claimed is:

1. An image recording apparatus, comprising:
   a recording head on which a plurality of recording sections are arranged dotted line-like in one or a plurality of rows;
   moving means for relatively moving the recording head and an image recording medium, wherein an image comprising a plurality of pixels is recorded by the plurality of recording sections of the recording head on the image recording medium relatively moved by the moving means; and
   control means for controlling each said recording section of the recording head to conduct turning on or off a plurality of N times so that each said pixel is recorded by plural recording periods of each said recording section;
   wherein the plural recording periods differ in time length, and the time length of each recording period is represented by both T(m) and TS(n);
   wherein the time length T(m) of each said recording period is not increased monotonously and is not decreased monotonously with respect to a sequential recording order "m" of each said recording period in recording of each said pixel, where "m" is an integer not less than 0 and not more than N−1; and wherein with respect to an order "n" in shortness of the recording periods, with "n" being an integer not less than 0 and not more than N−1, a length TS(n) of each recording period satisfies the following equation:

$$TS(n) = \alpha \times 2^n + \beta(n) + \gamma(n)$$

where $\alpha$ is a positive real number and a coefficient which does not depend on n, $\beta(n)$ is a positive real number which satisfies $\beta(n-1) \geq \beta(n)$ with respect to an arbitrary n not less than 1 and which also satisfies $0.1 \times \alpha \times 2^{N-1} > \beta(0) > \beta(N-1)$, and $\gamma(n)$ is a real number whose absolute value is not more than $(\alpha \times 2^n + \beta(n))/100$ with respect to an arbitrary n.

2. The image recording apparatus of claim 1, wherein, in recording of each said pixel, a longest recording period among the plural recording periods includes a time gravity center on elapsed time of all of the plural recording periods.

3. The image recording apparatus of claim 1, wherein in recording of each said pixel, a longest recording period among the recording periods exists between a second longest recording period and a third longest recording period in said sequential recording order.

4. The image recording apparatus of claim 1, wherein the control means controls each said recording section of the recording head according to image data, by selecting a combination of recording ON or recording OFF in the plural recording periods for each said pixel.

5. The image recording apparatus of claim 4, wherein the recording section comprises a light emitting section, the image recording medium is a photosensitive material, the recording period is an exposure period, the recording ON is an exposure ON, and the recording OFF is an exposure OFF.

6. The image recording apparatus of claim 5, wherein the image recording medium comprises a silver halide photographic photosensitive material.

* * * * *